(12) United States Patent
Snell

(10) Patent No.: US 12,167,715 B2
(45) Date of Patent: Dec. 17, 2024

(54) LIVESTOCK CONFINEMENT GATING SYSTEM AND METHOD

(71) Applicant: Hzarvestec, LLC, Ames, IA (US)

(72) Inventor: Lloyd D. Snell, Ames, IA (US)

(73) Assignee: Hzarvestec, LLC, Ames, IA (US)

( * ) Notice: Subject to any disclaimer, the term of this patent is extended or adjusted under 35 U.S.C. 154(b) by 4 days.

(21) Appl. No.: 18/088,938

(22) Filed: Dec. 27, 2022

(65) Prior Publication Data

US 2023/0133790 A1 May 4, 2023

Related U.S. Application Data

(63) Continuation-in-part of application No. 17/125,724, filed on Dec. 17, 2020, now Pat. No. 11,564,372.

(51) Int. Cl.
*A01K 1/00* (2006.01)
*A01K 1/01* (2006.01)

(52) U.S. Cl.
CPC .......... *A01K 1/0017* (2013.01); *A01K 1/0005* (2013.01); *A01K 1/0011* (2013.01); *A01K 1/01* (2013.01)

(58) Field of Classification Search
CPC ... A01K 1/0017; A01K 1/0005; A01K 1/0011
See application file for complete search history.

(56) References Cited

U.S. PATENT DOCUMENTS

| | | | | |
|---|---|---|---|---|
| 1,839,313 A | * | 1/1932 | Hibbs | A01K 1/0005 119/14.03 |
| 2,745,638 A | * | 5/1956 | O'Connor | E04H 17/18 256/25 |
| 3,215,118 A | * | 11/1965 | Behlen | E04C 2/427 52/630 |
| 3,577,956 A | * | 5/1971 | Forster | A01K 1/0005 119/451 |
| 4,176,621 A | * | 12/1979 | Dill | A01K 1/02 119/524 |
| 5,878,695 A | * | 3/1999 | Gent | A01K 1/0005 119/503 |
| 11,564,372 B2 | * | 1/2023 | Snell | A01K 1/0005 |
| 2014/0202082 A1 | * | 7/2014 | Johnson | E05C 19/006 16/231 |
| 2020/0396957 A1 | * | 12/2020 | Dahl | A01K 1/0011 |
| 2021/0238864 A1 | * | 8/2021 | Heatwole | E04F 15/02005 |
| 2022/0192141 A1 | * | 6/2022 | Snell | A01K 1/0005 |
| 2023/0133790 A1 | * | 5/2023 | Snell | A01K 1/0005 119/436 |

* cited by examiner

*Primary Examiner* — Jessica B Wong
(74) *Attorney, Agent, or Firm* — Jordan E. Meggison-Decker; BrownWinick Law Firm

(57) ABSTRACT

A gating system comprising a gate, footplate, formed latch assemblies, formed tab end assemblies, c-bracket, and parallel structural members which provides infinite mounting points to connect gates to slotted floor slates with a footplate. The gating system simplifies the design, manufacture, installation, and operation of animal management.

7 Claims, 37 Drawing Sheets

LIVESTOCK CONFINEMENT GATING SYSTEM AND METHOD

CROSS-REFERENCE TO RELATED APPLICATIONS

This application is a continuation in part of U.S. application Ser. No. 17/125,724 filed on Dec. 17, 2020, the entirety of which is incorporated herein fully by reference.

FIELD OF THE DISCLOSURE

A system and method for efficiently constructing confinement area for new and remodeled animal confinement production buildings.

BACKGROUND OF THE DISCLOSURE

Creating confinement area for animal production, such as those used in pork confinement barns include a vast array of designs developed throughout decades of component additions and modifications to solve the problems. The problems, such as structural failure, corrosion failure, animal control, animal entrapment, animal injury, and biosecurity issues all have driven these changes. The pen design in a particular facility is defined by floor slat slot configurations, gating lengths, post styles, feed line location, feeder size, desired animal groupings, movement options, cost, and customer preferences. With so many wants and constraints, every production barn is a custom gating system burdened with unnecessary overhead and manufacturing errors.

The hog confinement production barns, for example, have transitioned to wean-to-finish production. Therefore, the need to control very small "weaned" animals to market-weight requires alterations to pen hardware. Typically, the additional blocking components, "sometimes after thoughts", are added to either gates, t-post or square-posts preventing the small animal movement beyond and between pens.

The floor slats of a confinement building have slots that allow animal waste to transfer from the floor to a biowaste pit. The floor slats are produced in multiple configurations of width, length, number of slots, and configuration of slots. Additionally, the floor slats with unbalanced slot configurations are often installed in a particular slot stagger by alternating end-to-end orientations in the barn. There are instances of damaged floor slats being replaced with a different design, thus requiring locational attention to gating design when rebuilding a barn. Floor slats will remain the production standard for confinement floor and bio-waste management and gating hardware attachment for the foreseeable future.

The floor slat slots are also used to secure pen hardware to the floor. The pen sizes are a derivative of the barn dimensions and today's gating systems utilize large floor plates welded to t- and square-post to ensure the gating can be secured to the floor. Dill (U.S. Pat. No. 4,176,621) teaches a gating system wherein the gate panels are defined with vertical post with small mounting feet welded to the bottom. This design does not provide flexibility in mounting orientation, and this foot design is not compatible with the floor slats of the modern production barn. Gent (U.S. Pat. No. 5,878,695) teaches an extendable gate with slotted footplates that are sufficiently long to intercept multiple floor slat slots.

The floor slats over time experience surface wear, chips, and sagging between supporting structures. When a barn has sagging floor slats and is installing a new gating package, the onsite modifications to compensate for floor sagging add a significant cost, reduce the quality of the installation, and reduce the overall customer perception of quality.

The gates are in many forms of steel and non-steel materials; and built in vertical and horizontal dividers, sometime both in the same product assembly. The primary method of manufacturing the gates is to cut and weld components into rigid assemblies.

The current fixed-gate assembly designs require gates be supported at gate junctions or end points by a t- or square-post weldment with a large footplate to ensure sufficient length to attach to the floor slat, preferably with two fasteners. O'Connor (U.S. Pat. No. 2,745,638) teaches the requirement for posts in a gating system, wherein the gates are solid panels, specifically concrete panels. This is representative of the current hog confinement gating systems, gate panels with t-post and square post structural requirements.

Gates that swing are latched to the fixed-gate, t- or square-post using simple mechanical methods. These methods include drop rods which must be removed from the latch. Once removed, the drop rod can be dropped and end up in the biowaste pit located below the floor slats. Once dropped in the biowaste pit, the drop rod is not retrievable and is lost. Another option is a mechanical flipper lock that swings out of the way of a hinge point, referred to as a flag and pin. Once out of the way, the gate is lifted and opened. The flipper lock provides a mechanical stop to prevent the animals from lifting the gate and opening. The flipper lock must be blocked on the animal side of the gate to prevent accidental gate opening. This blocking component represents a historical modification made to maintain animal pen assignment.

Panel gates, steel or plastic, are very restrictive to air movement. Stainless steel gating is expensive and reserved for the very financially elite producers. Steel and imported galvanized gating remains a very viable and proven gating system. The gating package chosen for a barn is hardware and installation cost driven, except for very rare instances.

Pen configurations are primarily driven by the need to anchor the gates to t- and square-post to the floor slat slots at specific gate joints. Because of the many floor slat options, without knowing the exact layout of the slats, a gating installation is completely designed wrong and must be remanufactured. Furthermore, the engineering resource cost to create and recreate special assemblies can exceed the productivity value of a project.

T- and square-posts are the current method of connecting gates to the floor. Both are a vertical plate or tube welded to a large floorplate. Floorplates are commonly 8"×17"×½" thick with multiple parallel slots which are designed to perpendicularly intersect floor slat slots. Thus, allowing for the placement of two to four floor anchoring bolt assemblies. The floorplates are laser cut and the drops are calculated in the cost as scrap. Plates are commonly manufactured from steel or stainless steel. This method means every t- and square-posts are basically custom to a barn's design. The custom nature of the current gating design places great risk on the builder to deliver a product without errors.

During installation, the most common solution to wrong fitting equipment is to cut and reweld. When this involves stainless and galvanized materials, toxic gases are emitted and rarely are workers properly equipped with the correct protective equipment. When the modifications are made to hot dipped galvanized components and assemblies, the protective coating is destroyed, and repair is expensive, inadequate or never completed. Steel gates with no coating or a low-cost paint coating are least affected by in field modifications involving cutting and rewelding.

Therefore, for all the reasons stated herein, there is a need for a more standardized, minimize part and assembly count, robust, simplified broad application installation process, bio-secure, animal well-being focused, and cost-effective gating system.

Thus, it is an object of the disclosure to eliminate the need for t- and square-posts at gate assembly joints.

Another object of the disclosure is to linearly increase the number of locations a gate can be connected to the floor slat slots.

Yet another object of the disclosure is to maintain excellent air circulation associated with non-panel gates.

Another object of the disclosure is to provide a gating system that is easily cleaned, maintained, or improves the biosecurity capability.

Yet another object of the disclosure is to provide a gating system that has no internal cavities to house disease, thus improving the biosecurity capability.

Another object of the disclosure is to provide a gating system that has no sharp edges which could affect animal well-being.

Yet another object of the disclosure is to provide a gating system that attaches to the floor and is easily cleaned improving the biosecurity capability.

Another object of the disclosure is to provide a gating system that attaches to the floor and has no internal cavities to house disease, thus improving the biosecurity capability.

Yet another object of the disclosure is to provide a gating system which attaches to the floor and has no sharp edges which could affect animal well-being.

Another object of the disclosure is to provide a gating system wherein no component of the gating system can entrap or cause injury to the confined animal.

Yet another object of the disclosure is to simplify the installation of a gating system in new barns.

Another object of the disclosure is to simplify the installation of a gating system in old barns.

Yet another object of the disclosure is to simplify the installation of a gating system in old barns with sagging floors.

Another object of the disclosure is to eliminate over production waste associated with large footplates in a gating system.

Yet another object of the disclosure is to eliminate over production waste associated with t- and square-posts in a gating system.

Another object of the disclosure is to eliminate the need for t- and square-posts in a gating system.

Yet another object of the disclosure is to minimize manufacturing errors of a gating system.

Another object of the disclosure is to provide a gating system with reduced part variations.

Yet another object of the disclosure is to provide a gating system with higher and more statistically capable production methods.

Another object of the disclosure is to provide a gating system with a gate latch which cannot be opened by the confined animal.

Yet another object of the disclosure is a to provide a gating system with a gate latch that allows opening by swinging in or out at either end.

Another object of the disclosure is a gating system with a gate latch that is easily cleaned for biosecurity purposes.

Yet another object of the disclosure is to provide a gating system that has a gate latch which is fully protected from animal contact from both sides.

Another object of the disclosure is to provide a gating system that does not require removal of a drop rod to open the gate.

Yet another object of the disclosure is to provide a gating system that has a latch which cannot be removed and strike or poke the animals.

Another object of the disclosure is to minimize the number parts and assemblies to create confinement barn gating.

Yet another object of the disclosure is to provide a gating system with components which are utilized in moving and stationary applications.

Another object of the disclosure is to provide a gating system with a latch that is easily assembled and disassembled.

Yet another object of the disclosure is to provide a gating system with a latch that is used in all animal gating systems.

Another object of the disclosure is to provide a gating system with a latch that can work with multiple materials.

Yet another object of the disclosure is to provide a gating system with a latch that works with multiple finish coatings.

Another object of the disclosure is to provide a gating system that comprises a gate which works in any angular orientation to the floor slat slot.

Yet another object of the disclosure is to provide a gating system that comprises a gate to floor securing method which minimizes intrusion into the pen area.

Another object of the disclosure is to provide a gating system that comprises a gate to floor securing method that minimizes intrusion into walkways and alleys.

Yet another object of the disclosure is to provide a gating system that comprises a gate to floor securing method which eliminates over production waste associated with large foot plates.

Another object of the disclosure is to provide a gating system that comprises a gate to floor securing method which allows for use of multiple floor anchor bolts.

Yet another object of the disclosure is to provide a gating system that removes the design requirement about gate joint locations.

Another object of the disclosure is to provide a gating system that comprises a gate that does not have to be attached to a wall to be structurally sufficient for animal confinement.

Yet another object of the disclosure is to provide a gating system that comprises a gate to floor attaching method which allows for vertical positioning.

Another object of the disclosure is to provide a gating system that comprises a footplate that can secure a gate parallel to the floor slots.

Yet another object of the disclosure is to provide a gating system that comprises a footplate that can secure a gate perpendicular to the floor slats.

Another object of the disclosure is to provide a gating system that comprises a footplate that can secure a gate to the floor at any angle.

Yet another object of the disclosure is to provide a gating system that comprises a singular footplate for all installation requirements for fixed gating.

Another object of the disclosure is to provide a gating system that comprises a singular footplate, and by its production method, does not produce scrap or use excessive amounts of material associated with over production.

Yet another object of the disclosure is to provide a gating system that does not require any additional hardware, such as a flipper, to secure a gate in the latched state.

BRIEF SUMMARY OF THE DISCLOSURE

The disclosure relates to an improved gating system (also referred to as "pen", "pens", or "system" throughout the disclosure) for safely confining animals is presented. The disclosure relates to a system which enables high-volume manufacturing to minimize parts count, eliminates most welding, maximizes functionality, and reduces direct labor costs during manufacturing, installation, and utilization.

Additionally, the disclosure relates to an improved gating system which eliminates the historical design constraints associated with floor slat slots, t-posts, and square posts. The disclosure provides a gate structural system which allows the infinite positioning of a footplate, eliminating the requirement for t-posts and square posts. The infinitely positional footplate allows gates to be mount in any position, eliminating custom parts and over production waste.

The disclosure relates to an improved bi-directional gate latching method for movable and fixed-gate applications. The improved latch assembly prevents accidental opening and blocks unwanted movement between confinement areas. The improved latch assembly eliminates the need for tacked on components to solve confinement issues, reducing cost and errors associated with variation.

Furthermore, the disclosure relates to a four-component solution for confinement barn gating which comprises a gate, a footplate, a latch, and a c-bracket. Therefore, simplifying the design, manufacture, installation, and operator animal management. This is achieved with a novel gate design which includes two parallel structural members which provide an infinite mounting point to connect the gates to slotted floor slats with a footplate. The footplate is mountable to the two parallel structural members on either side of the gate in a planar or reverse planar installation.

Thus, ensuring the securing to that floor slat slots with a minimum of two clamping bolts per footplate. The footplate can be vertically adjusted for uneven or bowed floor slats. The latch is fully protected for animal releasing on both sides, allows a gate to swing open from either end, and swing clockwise and counterclockwise. The latch provides total blockage at the latch connection to prevent animal movement between confinement areas. The latch is also mountable to gates that are stationary and when used with a c-bracket can allow the quick release of other confinement elements, such as feeder for maintenance or cleaning. The c-bracket can be mounted to stationary and non-stationary structures.

DETAILED DESCRIPTION

Figure 1:
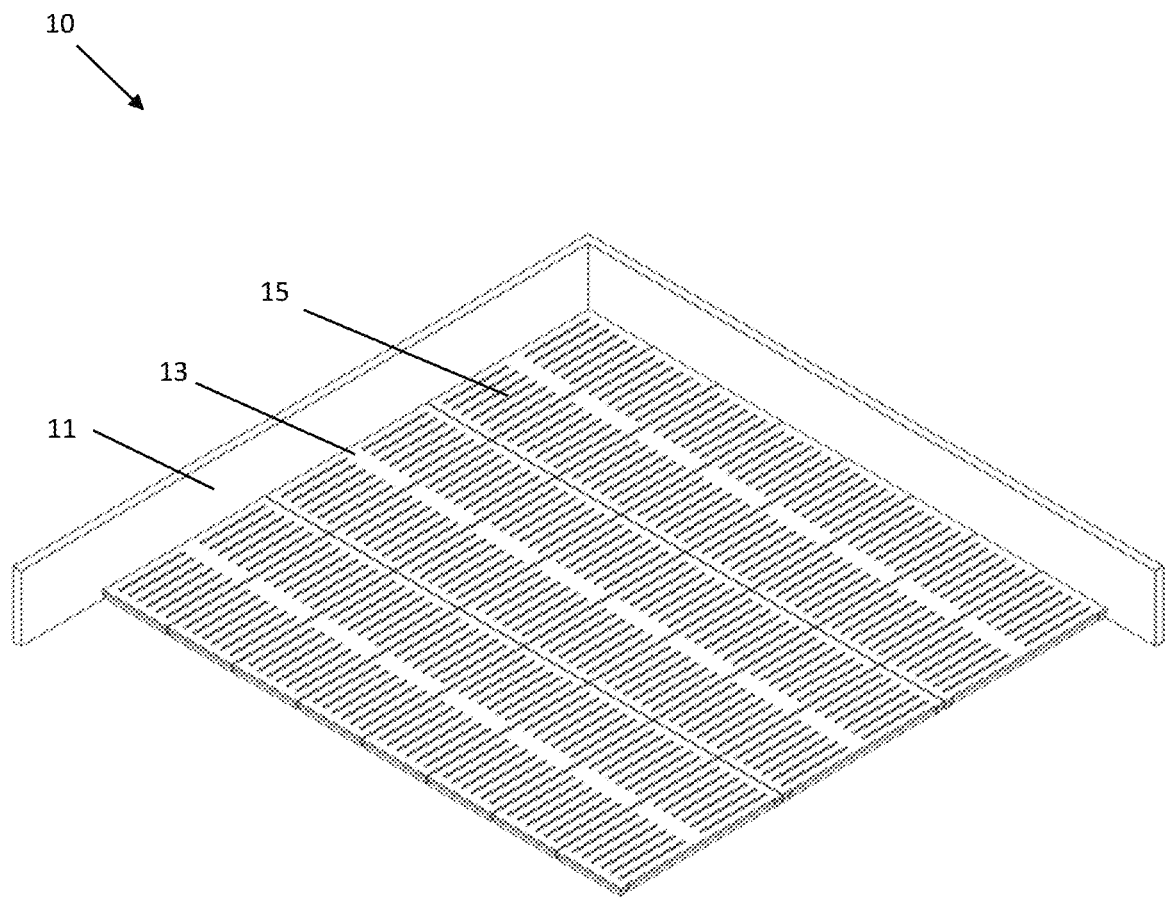
FIG. 1 is a perspective view of a modern confinement barn with a concrete exterior wall and floor slat panels install perpendicular to the longest side of the barn extending the width of the barn.

The typical animal production barn 10 is constructed of a series of at least one exterior, possibly at least one interior barn wall 11, and divided into a number of confinement areas (also referred to as "pen" or "pens" throughout the disclosure). The at least one barn wall 11 extends into the earth creating a volumetric biowaste storage (not shown) below the supported at least one floor slat panel 13. The at least one floor slat panel 13 has at least one floor slat slot 15 extruding through the at least one floor slat panel 13 providing biowaste flow to the biowaste storage below. The at least one floor slat slot 15 is also utilized to secure production hardware such as feeders, gating, and watering systems to the at least one floor slat panel 13.

There are multiple floor slat panel 13 width and length configurations; and the at least one floor slat slot 15 is equally or unequally patterned linearly and laterally. For instance, the at least one floor slat panels 13 linearly aligned slots are two (2) linearly equal floor slat slot 15 as shown; two (2) slots of different lengths; three (3) slots configuration with the middle slot being longer than the two (2) slots on the sides; or any combination thereof. Slots are equally laterally patterned across the width of the at least one floor slat panel 13. In one embodiment, the at least one floor slat panel 13 are reinforced cast concrete and drilling to secure penning equipment is not allowed due to degrading the structural integrity.

This disclosure teaches a method that eliminates the Gate Alignment Error (GAE), also referred to as "error" and "repetition error" throughout the disclosure, which drives the requirement for large footplates, as well as t-posts and square-posts. The gate alignment error herein is disclosed mathematically and is based on the Remainder Theory where results are the summation of an integer value (I) and a remainder (R), where 0≤R<1. The numerator of the ratio is the barn length (L) divide by the number of desired confinement areas (N) and divided by denominator of the width (W) of the at least one floor slat panel 13 divided by the number of n−1 floor slat slots 15, Equation 1. The remainder R, determines if the gate line centerlines repeat, alternatingly repeat, or effectively non-repeating.

Equation 1

$$GAE = \frac{\left(\frac{L}{N}\right)}{\left(\frac{W}{n-1}\right)} = I + R, \text{ if } R = \begin{vmatrix} 0, \text{ no repetition error} \\ 0.5, \text{ alternating position requirement} \\ \text{other, repetition error} \end{vmatrix}$$

For example, a standard barn 10 is two hundred (200) feet long, requires fifty (50) floor slat panels 13, each four (4) feet wide, with eight (8) floor slat slots 15 is configured into eighteen (18) equal confinement areas or pens.

$$\frac{\left(\frac{200}{18}\right)}{\left(\frac{4}{8-1}\right)} = 19 + 0.44$$

The solution is I=19 and R=0.44, meaning the relative location of a gate line parallel to the floor slat slot 15 is not a repeating pattern, i.e. R≠0. Since it is not practical to make individual t- and square-posts for specific line positions, extra-large footplates 81 are made to universally fit non-repeating gate line locations, effectively an over production waste.

The remainder ($R_c$) for subsequent gate lines for this example are calculated using equation 2 (as provided below) and the results are $R_c(1)$=0.44; $R_c(2)$=0.88; $R_c(3)$=0.32; ... $R_c(n)$. For this example, the pattern would repeat after 25 gate line positions, thus for this example of a two hundred (200) foot barn, every gate line would be uniquely positioned between two floor slat slots 15.

$$R_c(g_c) = g_c * R = I + R_c | g_c = 1, 2, \ldots, n$$

Equation 2

The distance a gate line centerline will be located from the centerline of the at least one floor slat slot 15 is calculated using equation 3 (as provided below).

$$D(g_c) = R_c(g_c) * \left(\frac{W}{n-1}\right) | g_c = 1, 2, \ldots, n \qquad \text{Equation 3}$$

Thus, the distance for the third gate line centerline from the floor slat slot to a of gate line is calculated, given $R_c(3)=0.32$.

$$D(3) = R_c(3) * \left(\frac{4}{8-1}\right) = 0.183 \text{ ft (2.19 in)}$$

If R=0, the gate line centerline will have the same relative position to the at least one floor slat slot 15 at every instance in a barn 10 installation. This location will either be repeatedly directly above the centerline of the at least one floor slat slot 15.

If R=0.5, the gate line centerline will have the same, but alternating relative position to the at least one floor slat slot 15 at alternating instances in a barn 10 installation. The location will alternate from directly above the centerline of the at least one floor slat slot 15 and or equally centered between two floor slat slots 15 at then subsequent gate centerlines.

A repeating gate line, R=0, would occur by varying barn length and maintaining an 18-pen configuration at 72 ft, 144 ft, 216 ft, and every increment of 72 ft thereafter. This clearly alters the confinement area, which are typically driven by optimizing number of animals a feeder can service.

An alternating gate line, R=0.5, would occur by varying barn 10 length and maintaining an 18-pen configuration at 36 ft, 108 ft, 180 ft, and every increment of 72 ft thereafter.

The disclosed fixed-gate assembly (also referred to as "gate" throughout the disclosure) 20 (FIG. 2) requires at least two (2) structurally significant longitudinally extending members 21. A structurally significant longitudinally extending member 21 is defined as a member sufficient to transfer to the floor attaching method without yielding due to animal gate loading forces, such as pushing, pulling, lifting, and climbing. The at least two (2) structurally significant longitudinally extending members 21 are captured and welded in holes of the at least one vertical plate 23. The at least two (2) structurally significant longitudinally extending members 21 provide an infinite horizontal mounting position between the at least one vertical plate 23 and the at least one vertical plate 23 parallel and offset. The at least two (2) structurally significant longitudinally extending members 21 provide for vertical positioning of the fixed-gate assembly 20. In one embodiment, infinite longitudinally mounting positions are utilized. It is worth noting, vertical height positioning and rotation control are further discussed below. The at least one top structural longitudinally extending member 25 is shown as a standard piece of angle iron but may be comprised of any material or geometry required to increase the vertical and lateral strength of the at least one fixed-gate assembly 20. The remainder of the at least one longitudinally extending members 27 are typically not structurally significant, are cost driven, and are spaced to prevent animal movement between confinement areas. Furthermore, the longitudinally extending member 27 may be structurally equivalent to the at least one structurally significant longitudinally extending member 21 or of lessor structural value. Typically, a maximum distance between the lower structurally significant longitudinally extending member 21 and the at least one longitudinally extending member 27 or an additional structurally significant longitudinally extending member 21 is approximately 1⅝" (inch) is required to prevent animals, such as weaned pigs, from moving between confinement areas. The gap requirement between the consecutive at least one structurally significant longitudinally extending member 21 or the at least one longitudinally extending member 27 increases as approaching the top of the at least one gate assembly 20, since the penned animals increased height and girth increase with age. This gap and number of longitudinally extending members can vary based on the size of the housed animals. The at least two (2) structurally significant longitudinally extending members 21 is any geometry, solid or hollow, capable of transferring gate loading to vertical plate 23 without failure; and spaced vertically at any increment. The at least one vertical plate 23 can include any combination of mounting holes 24 used to secure the at least one fixed-gate assembly 20 to additional gates, components, or building structures. The at least one fixed-gate assembly 20 constructed of solid material geometries, such as round bar as shown, have proven to be easily cleanable and does not provide internal host site cavities for disease growth, thus, improving barn biosecurity effectiveness and animal well-being. The at least one fixed-gate assembly 20 is configured to be a fixed-gate or a swing-gate assembly 40 (also referred to as "gate" throughout the disclosure), disclosed later. Additionally, the welded steel fixed-gate assembly 20 have proven cost effective and promote excellent air movement ventilation. The at least one structurally significant longitudinally extending members 21 and the at least one longitudinally extending members 27 in combination and alternative combinations thereof, is consider structurally sufficient subsets capable of transferring animal gate loading to the floor attaching method without yielding. The welded steel fixed-gate assembly 20 when fully welded is defined as a rigid body.

Figure 3:
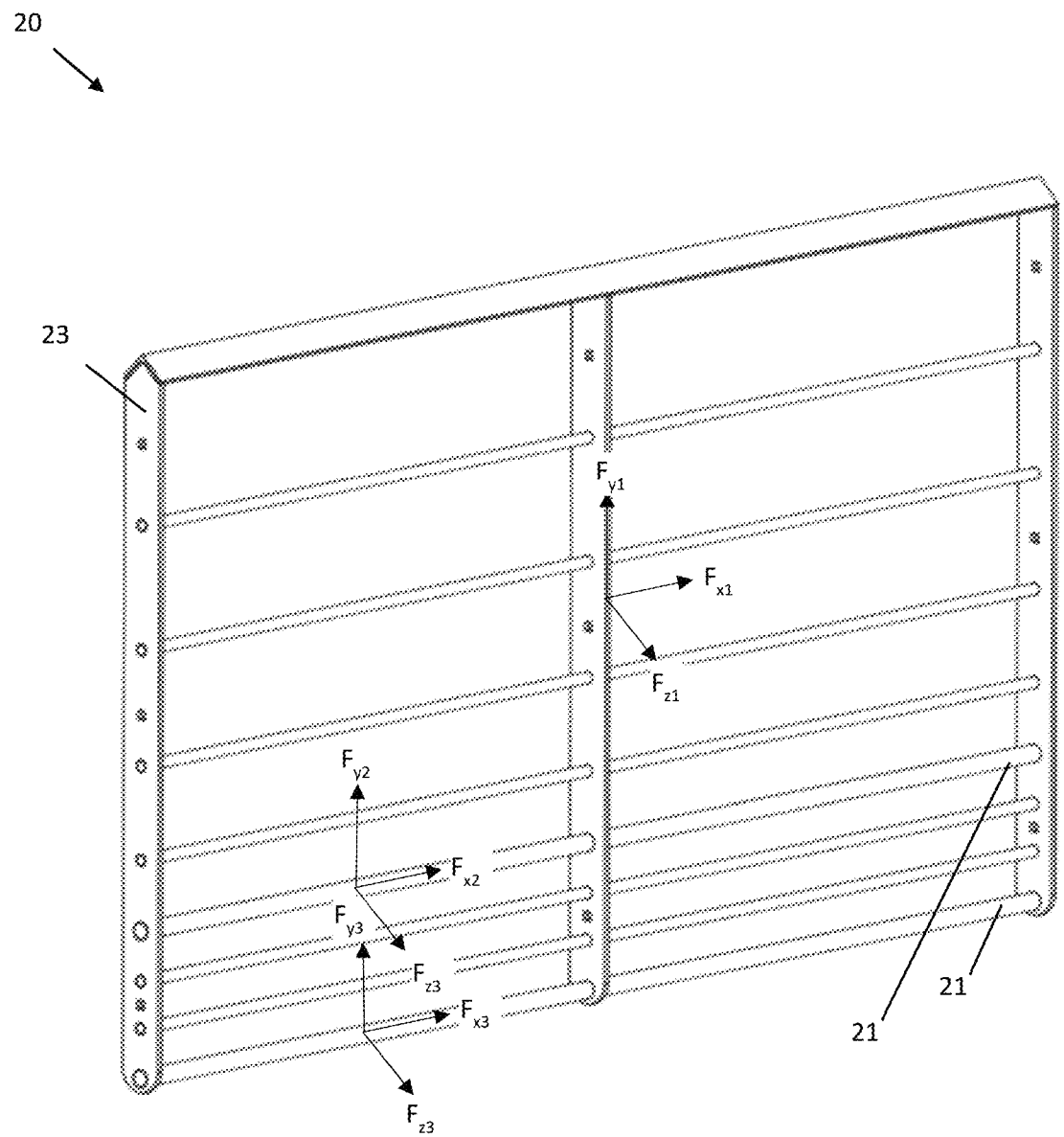
FIG. 3 is a perspective view of a fixed-gate assembly and the force components assuming the gate to be a welded rigid body.

The at least one fixed-gate assembly 20, a rigid body, transfers the at least one animal force applied components $F_{x1}$, $F_{y1}$, $F_{z1}$ to the at least one structurally significant longitudinally extending member component forces $F_{x2}$, $F_{y2}$, $F_{z2}$ and structurally significant longitudinally extending member component forces $F_{x3}$, $F_{y3}$, $F_{z3}$ located at any axial position along the at least one structurally significant longitudinally extending members 21 (see FIG. 3).

Figure 4:
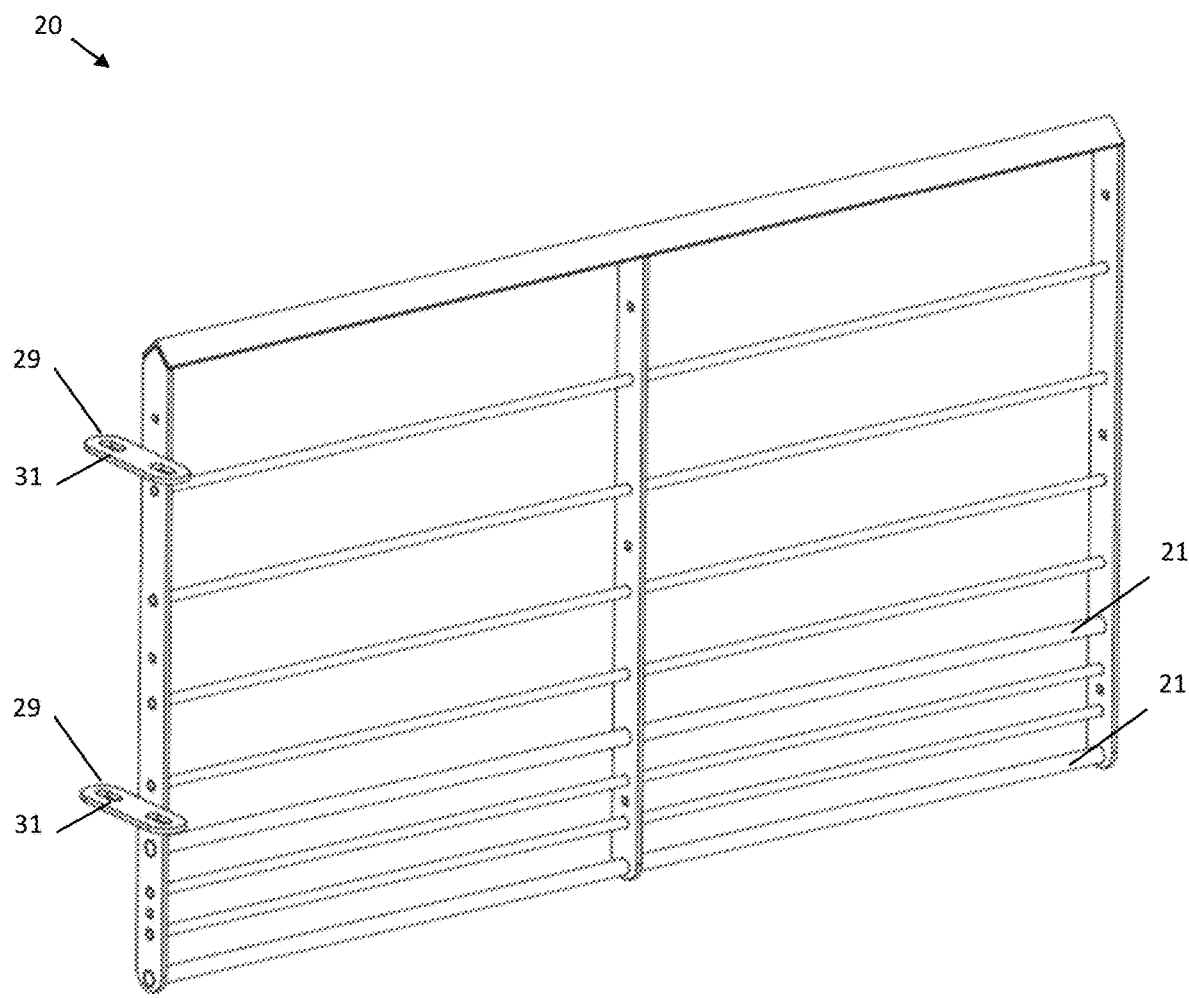
FIG. 4 is a perspective view of a fixed-gate assembly used for creating pen gating that does not move and has tabs attached that allow a swing-gate to attach or pivot.

The at least one fixed-gate assembly 20 is configured with the at least one vertical plate 23 having at least one tab 29, which has at least one cutout feature, such as a tab-slot 31 (see FIG. 4). The at least one tab-slot 31 cut features are commonly a slot or round hole but may be any required geometry without departing from the scope of the disclosure. The at least one tab 29 is positioned on any side of any the at least one vertical plate 23, or all the at least one vertical plate 23 forming a fixed-gate assembly 20. The at least one tab 29 is shown as a welded component but could be attached by other methods such as bolting, riveting, crimping, or bonding without departing from the scope of the disclosure. Furthermore, the at least one tab 29 could be positioned and mounted similarly to the at least one swing-gate assembly 40.

Figure 2:
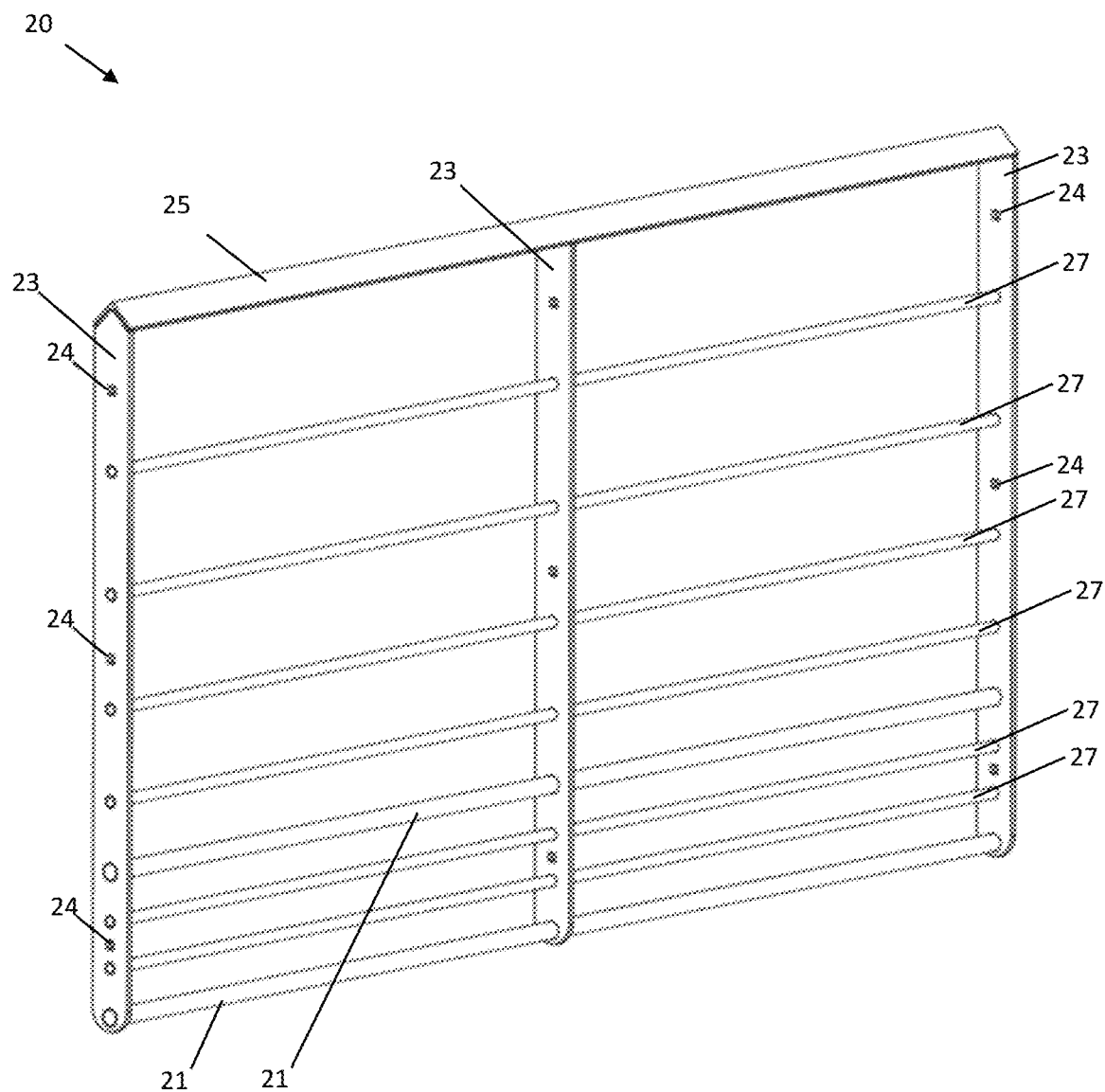
FIG. 2 is a perspective view of a fixed-gate assembly used for creating pen gating that does not move when secured to the floor or other permanent structure.

The at least one fixed-gate assembly 20 disclosed in FIG. 2, FIG. 3, and FIG. 4 with the at least two (2) structurally significant longitudinally extending members 21 are typically used as stationary gates. The at least one fixed-gate assembly 20 when secured to the at least one floor slat panel 13 is structurally sufficient to provide point of rotation for at least one swing-gate assembly 40 about at least one tab-slot 31, in addition to preventing animal movement between confinement areas.

Figure 5:
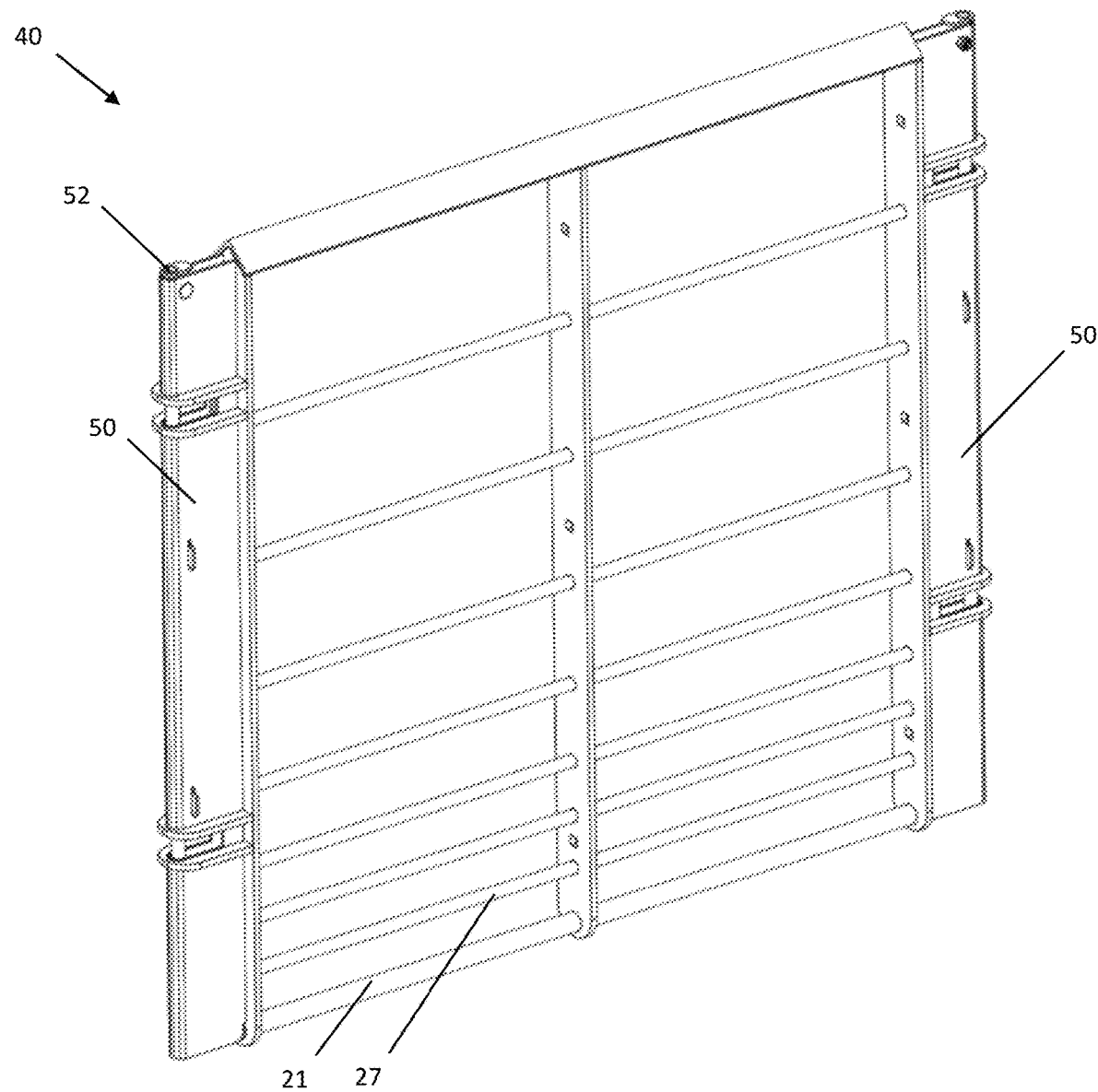
FIG. 5 is a perspective view of a swing-gate assembly with the exoskeletal latch assembly on both ends. The swing-gate assembly is opened and closed from either end and can swing clockwise or counterclockwise from either end.

The at least one fixed-gate assembly 20 is configured with at least one latch assembly 50 (see FIG. 5). The at least one latch assembly 50 has at least one hinge pin weldment 52 (see FIG. 6), thus forming the at least one swing-gate assembly 40. The at least one swing-gate assembly 40 does not require the at least two (2) structurally significant longitudinally extending members 21 as the at least one swing-gate assembly 40 is not secured to the at least one floor slat 13. The at least one latch assembly 50 when used with an apposing latch assembly 50 allows lifting the at least one hinge pin weldment 52 decoupling the at least one swing-gate assembly 40 from the at least one tab 29 (also referred to as "unlatched" throughout the disclosure). Thus, rotating clockwise or counter-clockwise direction about the at least one upper hinge pin 53 and lower hinge pin 55 which are captured (also referred to as "latched" throughout the disclosure) in the at least one apposing tab-slot 31. The at least one latch assembly 50 is used on the at least one fixed-gate assembly 20, the at least one swing-gate assembly 40, the at least one wall 11, or other gating or building elements and perform the latch and unlatch function as a fixed or moving latch assembly 50.

Figure 6:
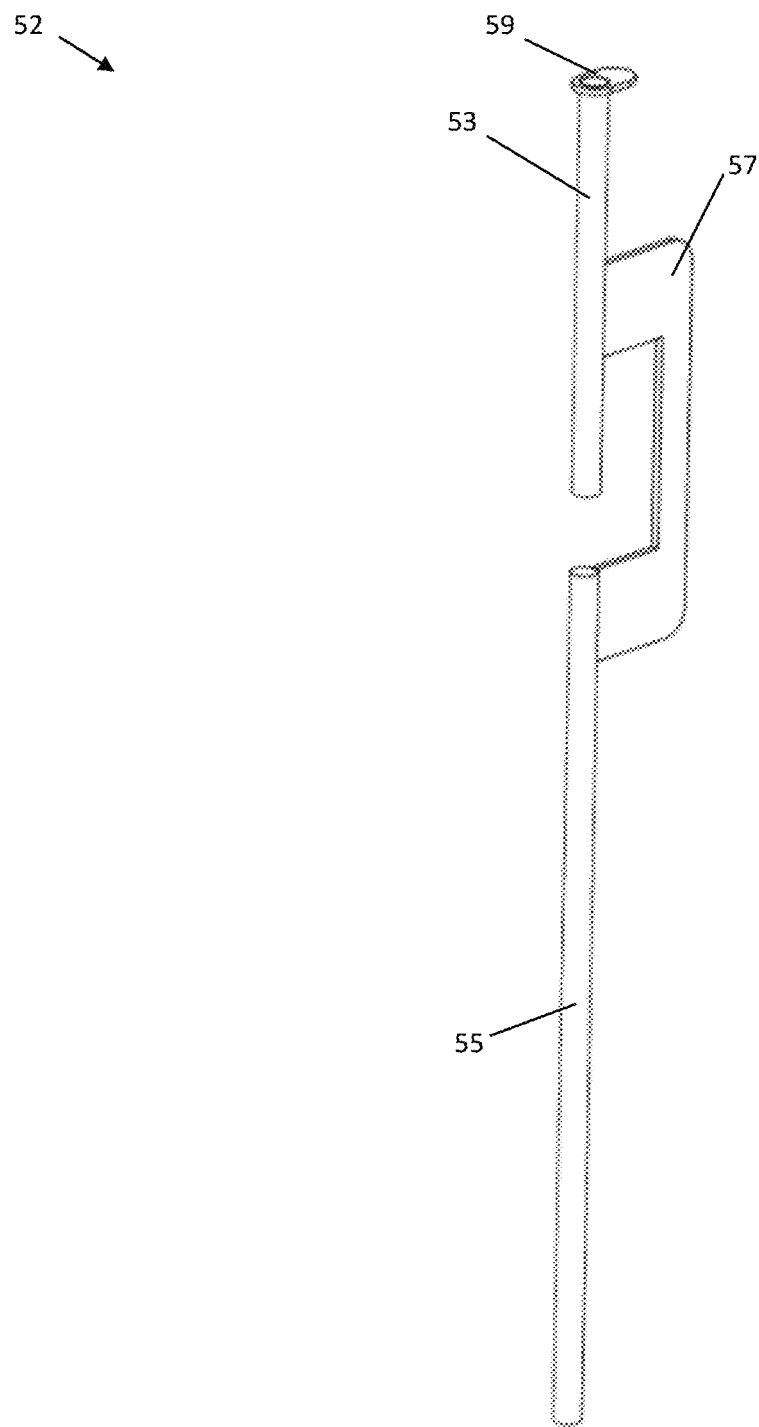
FIG. 6 is a perspective view of the gate rod assembly (also referred to as the hinge pin weldment) used inside of the exoskeletal latch assembly to latch or release a swing-gate assembly.

The at least one hinge pin weldment 52 is disclosed as a welded assembly constrained to linear motion within the least one latch assembly 50 (see FIG. 6). The at least one hinge pin weldment 52 includes the at least one upper hinge pin 53, lower hinge pin 55, hinge pin connector plate 57 and the at least one lift tab 59. The at least one upper hinge pin 53 is approximately coaxial with the at least one lower hinge pin 55. The at least one upper hinge pin 53 is welded to the at least one hinge pin connector plate 57 which is welded to the at least one lower hinge pin 55. The spacing between the at least one upper hinge pin 53 and at least one lower hinge pin 55 allows the at least one swing-gate assembly 40 to be unlatched and rotated away from the at least one tab 29, thus opening.

Figure 7:
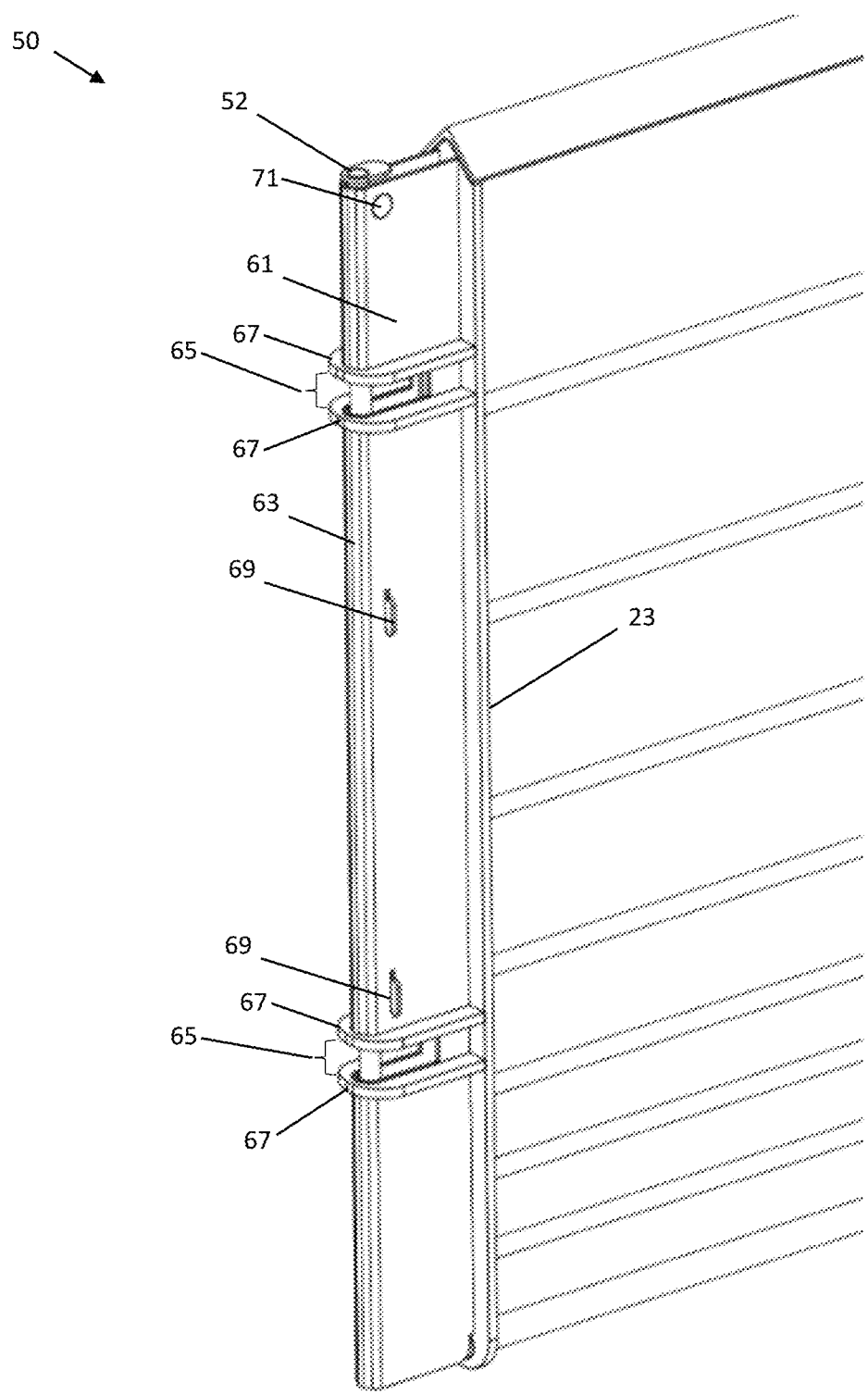
FIG. 7 is a perspective view of the exoskeletal latch assembly with the gate rod assembly installed and in the latched state.

The at least one latch assembly 50 (see FIG. 7), is formed by at least one u-channel 61 shape. The at least one formed u-channel 61 is formed by two relatively parallel planar surfaces of equal length, connected by the at least one radius bend 63 tangent to the two relatively parallel and apposing planar surfaces. The at least one radius bend 63 provides a load bearing and guide surface for the at least one upper hinge pin 53 and the at least one lower hinge pin 55 of the at least one hinge pin weldment 50. The at least one radius bend 63 could be replaced with any surface profile that provides the required load bearing surfaces to support and hinge pin location, guiding, and linear motion of the latching function.

The at least one u-channel 61 has at least one tab relief slot 65 that allows the latch assembly 50 to align the at least one upper hinge pin 53, at least one lower hinge pin 55 to normally align with the at least one tab-slot 31 in the at least one tab 29 which is secured to at least one fixed-gate assembly 20, the at least one wall 11, the at least one feeder, stationary, or non-stationary barn elements. The at least one tab relief slot 65 height and width is sized to allow the swing-gate assembly 40 to easily unlatch, open, close and relatch.

The at least one u-channel 61 as shown is fabricated from thin material and the contact surface area of the at least one tab relief slot 65 with the at least one tab 29 is relatively minimal. This minimal contact area could result in excessive wear and premature failure. To obtain life expectation, requires increasing the contact surface area, the at least one wear plate 67 with an inner surface approximately the same as the outer surface of the at least one u-channel 61, a greater outer perimeter and positioned parallel with the upper surface of the at least one tab relief slot 65 and welded. The at least one wear plate 67 in addition to improving the gate contact surface and wear, creates an exoskeletal structure when welded to the at least one u-channel 61 and the at least one vertical plate 23 increasing the lateral stiffness. The at least one u-channel 61 and the at least one wear plate 67 when welded or joined to other plate geometries other that the at least one vertical plate 23 allows for mounting of the at least one latch assembly 50 to other barn components or structures, stationary or moving as a bolt on feature.

The at least one hinge pin weldment 52 is positioned within the at least one latch assembly 50 from the top and constrained axially within the at least one u-channel 61 with the at least one bolt and nut 71. The at least one bolt and nut 71 prevents the at least one hinge pin weldment 52 within the at least one latch assembly 40 from removal and loss due to accidental dropping into the biowaste pit. The axial positioning within the at least one hinge pin weldment 52 and the at least one u-channel 61 is further reinforced with the at least one pin guide 69.

Figure 8:
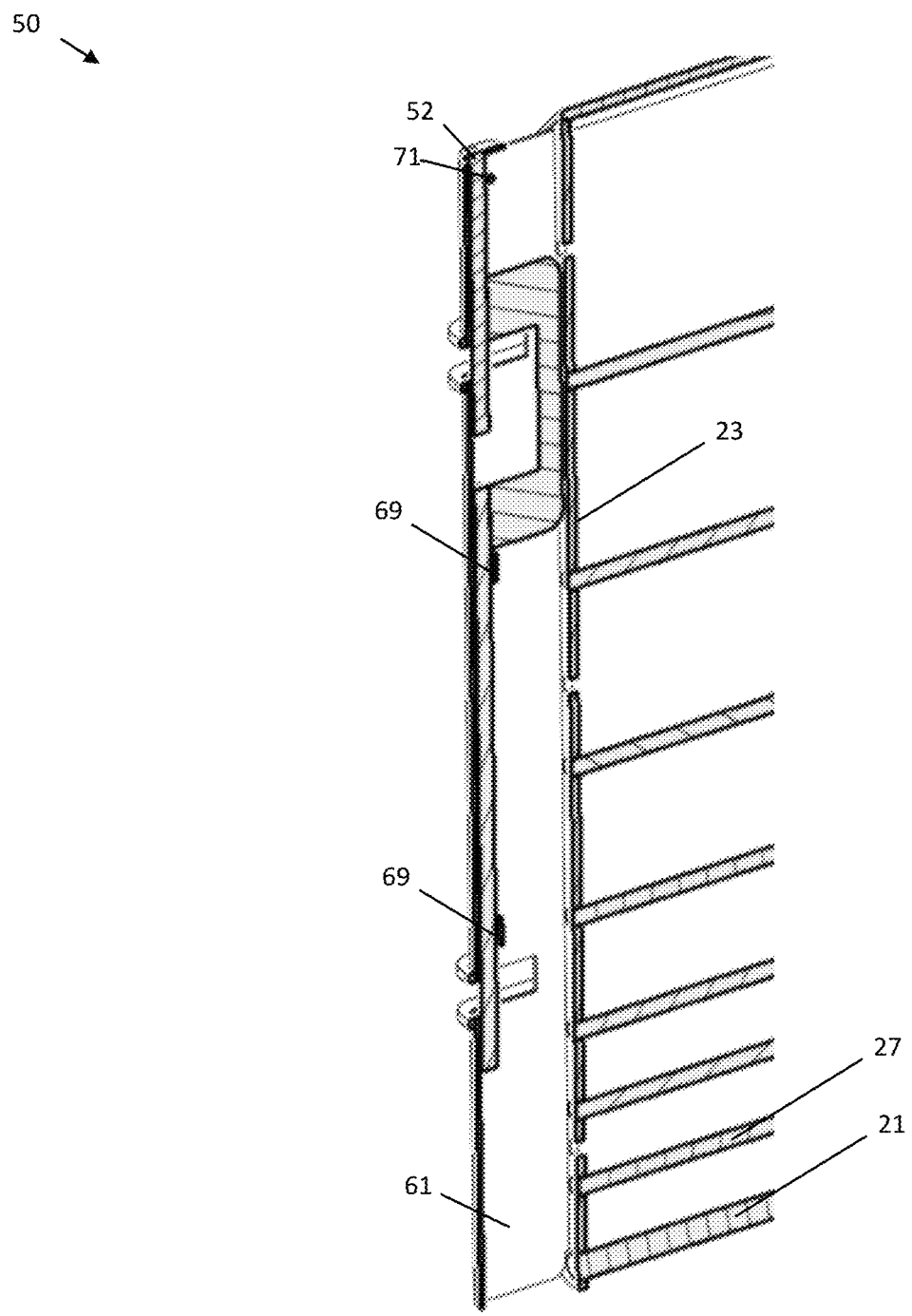
FIG. 8 is a sectioned perspective view of the internal relationship between the exoskeletal latch assembly and the gate rod assembly in the latched state.

The at least one latch assembly 50 sectional view in FIG. 8 shows the component and assembly relationships of the at least one hinge pin weldment 52, the at least one latch assembly 50, the at least one pin guide 69, the at least one bolt and nut 71, the at least one structurally significant longitudinally extending members 21, the at least one longitudinally extending members 27, and the at least one vertical plate 23 according to one embodiment. More clearly shown is how the vertical travel of the at least one hinge pin weldment 52 is limited by the at least one bolt and nut 71, and the lower vertical travel is stopped by the at least one pin guide 69.

Figure 29:
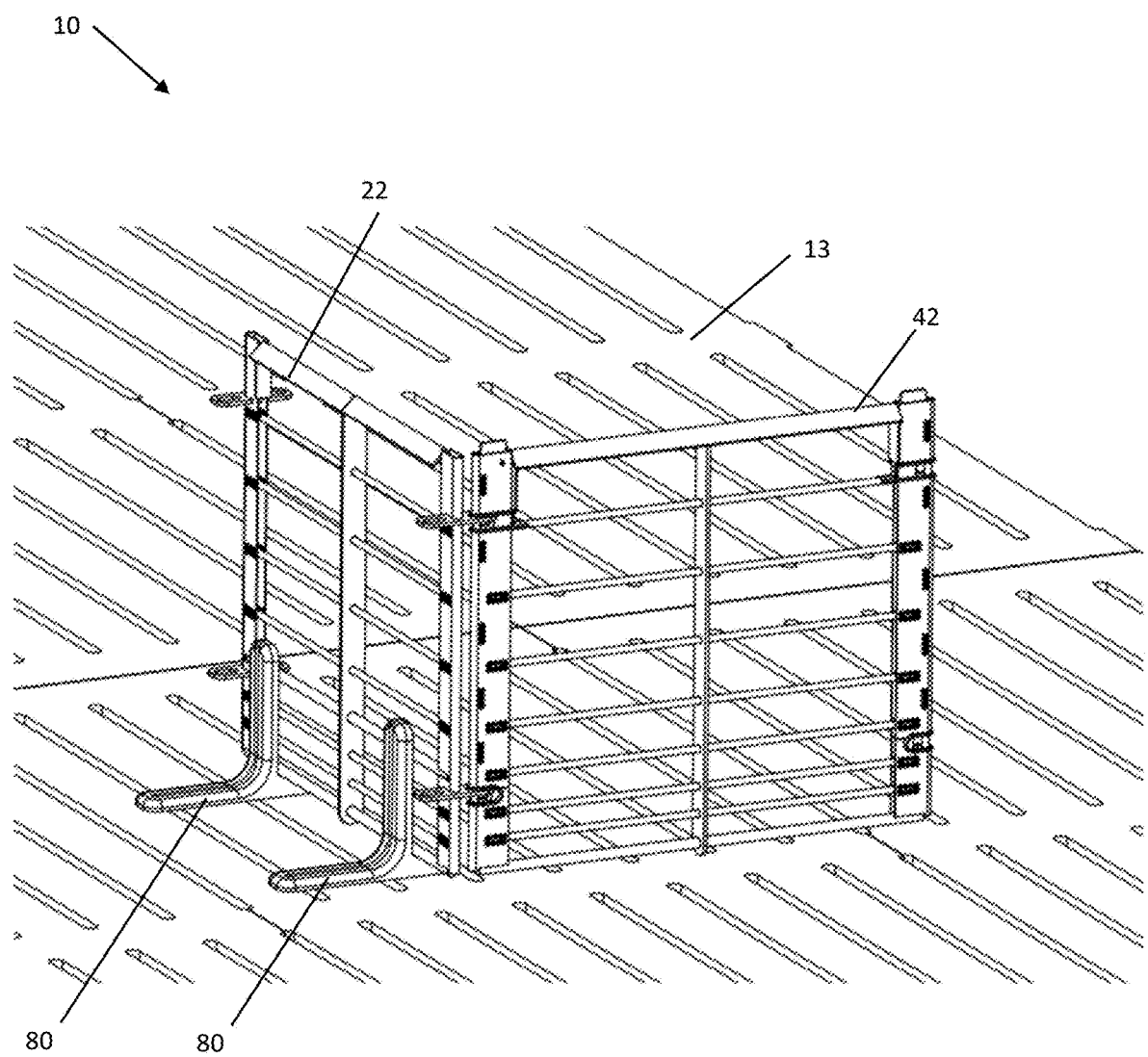
FIG. 29 is a perspective view of a exoskeletal swing-gate assembly with formed latch assemblies, a exoskeletal fix-gate assembly with formed tab assemblies, secured to a floor slat with footplate assembly.
Figure 30:
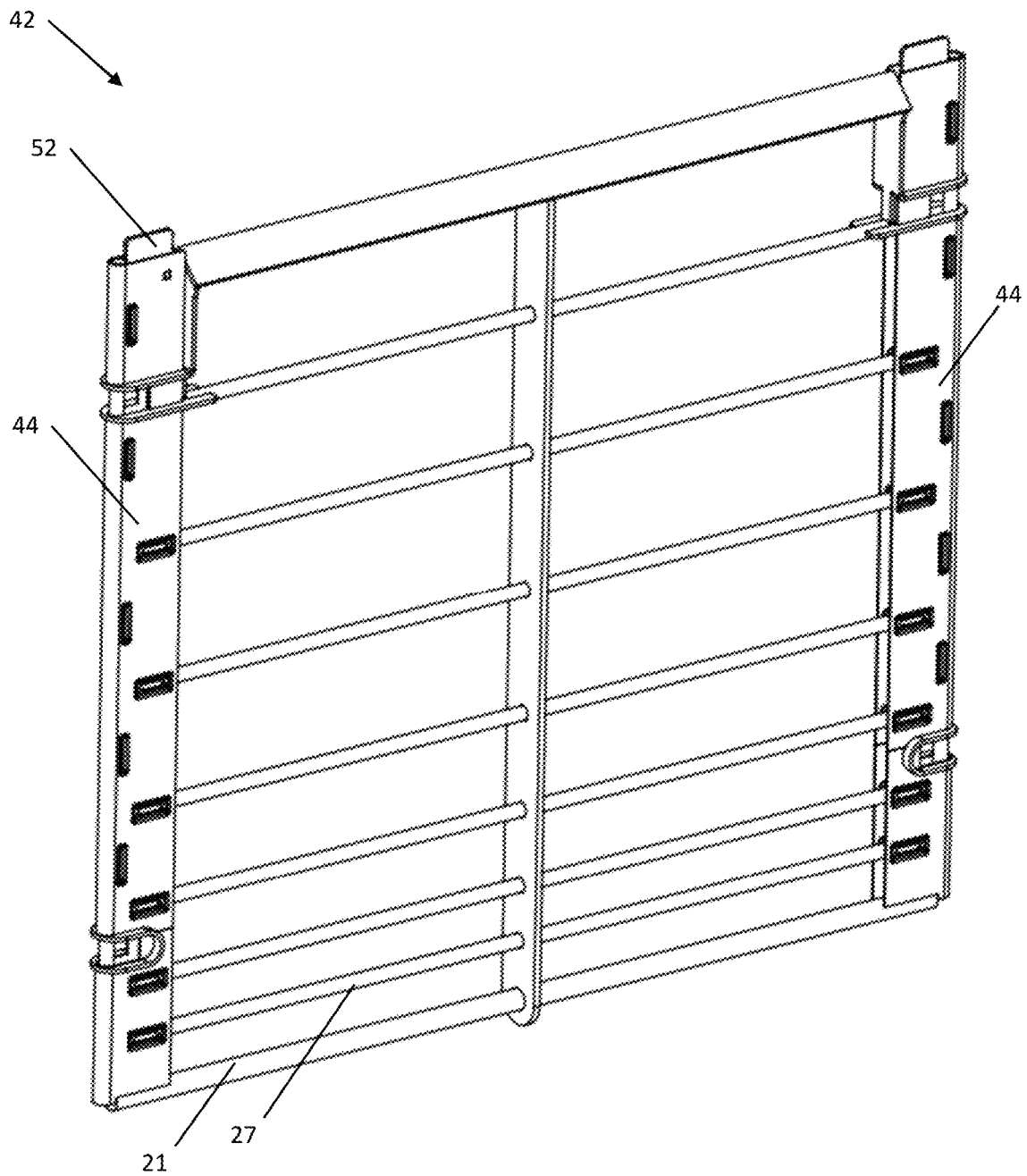
FIG. 30 is a perspective view of a exoskeletal swing-gate assembly with the formed latch assembly on both ends. The exoskeletal swing-gate assembly is opened and closed from either end and can swing clockwise or counterclockwise from either end.
Figure 31:
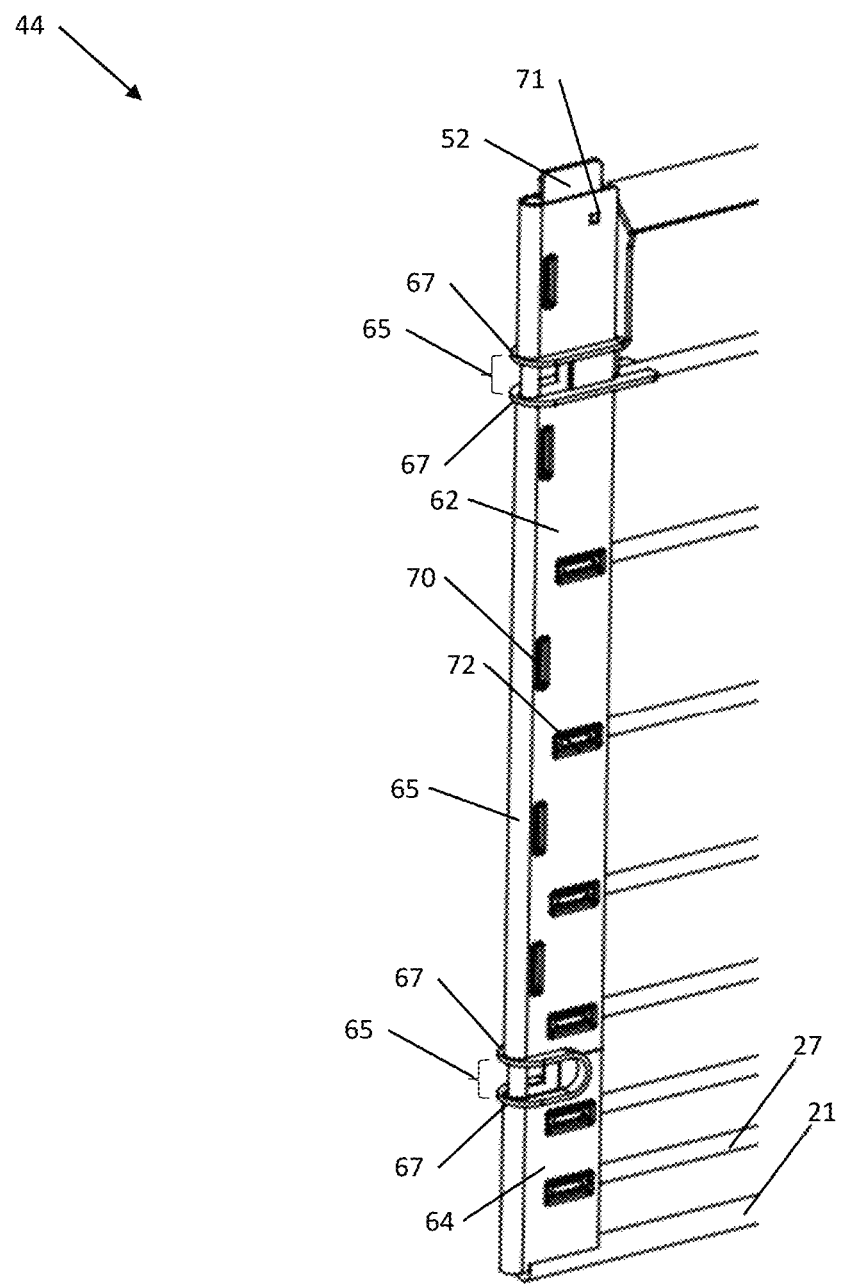
FIG. 31 is a perspective view of a exoskeletal swing-gage assembly formed latch. The formed shapes and geometries structurally containing significant longitudinally extending members, longitudinally extending members and the latch pin assembly.

A disclosed formed exoskeletal fixed-gate assembly (also referred to as "gate" throughout the disclosure) 22 (FIG. 29) requires at least two (2) structurally significant longitudinally extending members 21. The at least two (2) structurally significant longitudinally extending members 21 are captured and welded to the at least one formed tab end assembly 46 (FIG. 31). The at least two (2) structurally significant longitudinally extending members 21 can be captured and welded to the at least one formed latch assembly 44, (FIG. 30). The disclosed formed fixed-gate assembly 22 can be configured with any combination and number of formed tab assemblies 46, formed latch assembly 44, and vertical plates 23.

The disclosed formed exoskeletal fixed-gate assembly 22 with the at least two (2) structurally significant longitudinally extending members 21 are captured and welded in holes of the at least one vertical plate 23 when required by length. The at least one top structural longitudinally extending member 25 is shown as a standard piece of angle iron but may be comprised of any material or geometry required to increase the vertical and lateral strength of the at least one formed exoskeletal fixed-gate assembly 42. The remainder of the at least one longitudinally extending members 27 are typically not structurally significant, are cost driven, and are spaced to prevent animal movement between confinement areas. The at least two (2) structurally significant longitudinally extending members 21 is any geometry, solid or hollow, capable of transferring gate loading to the at least one formed latch assembly 44 and the at least one vertical plate 23 without failure; and spaced vertically at any increment. The at least one vertical plate 23 can include any combination of mounting holes 24 used to secure the at least one formed exoskeletal fixed-gate assembly 42 to additional gates, components, or building structures.

The disclosed formed exoskeletal fixed-gate assembly 22 constructed of solid material geometries, such as round bar as shown, have proven to be easily cleanable and does not provide internal host site cavities for disease growth, thus, improving barn biosecurity effectiveness and animal well-being.

The welded steel formed exoskeletal fixed-gate assembly 22 have proven cost effective and promote excellent air movement ventilation. The at least one structurally significant longitudinally extending members 21 and the at least one longitudinally extending members 27 in combination and alternative combinations thereof, is consider structurally sufficient subsets capable of transferring animal gate loading to the floor attaching method without yielding. The welded steel formed exoskeletal fixed-gate assembly 22 when fully welded is defined as a rigid body.

The at least one formed exoskeletal fixed-gate assembly 22, a rigid body, transfers the at least one animal force applied components $F_{x1}$, $F_{y1}$, $F_{z1}$ to the at least one structurally significant longitudinally extending member component forces $F_{x2}$, $F_{y2}$, $F_{z2}$ and structurally significant longitudinally extending member component forces $F_{x3}$, $F_{y3}$, $F_{z3}$ located at any axial position along the at least one structurally significant longitudinally extending members 21 (see FIG. 3). A disclosed formed exoskeletal swing-gate assembly (also referred to as "gate" throughout the disclosure) 42 (FIG. 29) requires at least one (1) structurally significant longitudinally extending member 21. The at least one (1) structurally significant longitudinally extending member 21 are captured and welded to the at least one formed latch end assembly 44 (FIG. 31). The at least one (1) structurally significant longitudinally extending member 21 and the at least longitudinally extending member 27 can be captured and welded to the at least one formed tab end assembly 46. The disclosed formed exoskeletal swing-gate assembly 42 can be configured with any combination and number of formed latch assembly 44, formed tab assemblies 46 and vertical plates 23.

The disclosed formed exoskeletal swing-gate assembly 42 with the at least one (1) structurally significant longitudinally extending members 21 are captured and welded in holes of the at least one vertical plate 23 when required by gate length. The at least one top structural longitudinally extending member 25 is shown as a standard piece of angle iron but may be comprised of any material or geometry required to increase the vertical and lateral strength of the at least one formed exoskeletal swing-gate assembly 42. The remainder of the at least one longitudinally extending members 27 are typically not structurally significant, are cost driven, and are spaced to prevent animal movement between confinement areas. The at least one (1) structurally significant longitudinally extending members 21 is any geometry, solid or hollow, capable of transferring gate loading to the at least one formed latch assembly 44, the at least one formed tab end assembly 46, and the at least one vertical plate 23 without failure; and spaced vertically at any increment. The at least one vertical plate 23 can include any combination of mounting holes 24 used to secure the at least one formed exoskeletal swing-gate assembly 42 to additional gates, components, or building structures.

The disclosed formed exoskeletal swing-gate assembly 42 constructed of solid material geometries, such as round bar as shown, have proven to be easily cleanable and does not provide internal host site cavities for disease growth, thus, improving barn biosecurity effectiveness and animal well-being.

The at least one formed latch assembly 44 (FIG. 31) shows the component and assembly relationships of the at least one hinge pin weldment 52, the at least one upper u-channel 62, the at least one lower u-channel 64, the at least one wear plate 67, the at least one formed pin guide 70, the at least one formed longitudinally extending member guide 72, the at least one bolt and nut 71, the at least one structurally significant longitudinally extending members 21, and the at least one longitudinally extending members 27.

Figure 35:
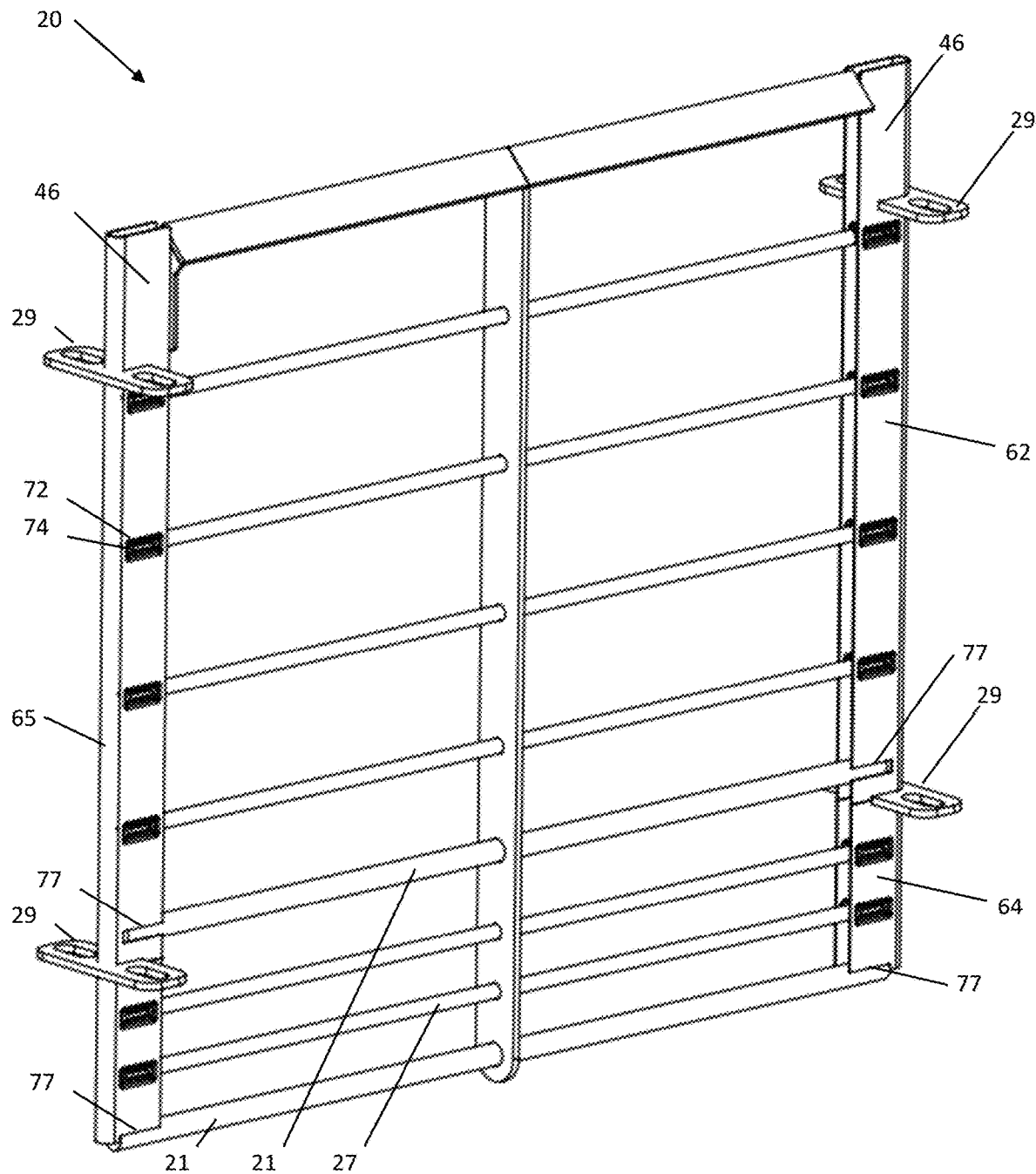
FIG. 35 is a perspective view of a exoskeletal fixed-gate assembly with the formed assembly on both ends with tabs and geometries structurally containing significant longitudinally extending members, and longitudinally extending members.

The at least one formed tab end assembly 46 (FIG. 35) shows the component and assembly relationships of the at least one upper u-channel 62, the at least one lower u-channel 64, the at least one tab 29, the at least one formed longitudinally extending member guide 72, the at least one structurally significant longitudinally extending members 21, and the at least one longitudinally extending members 27.

Figure 32:
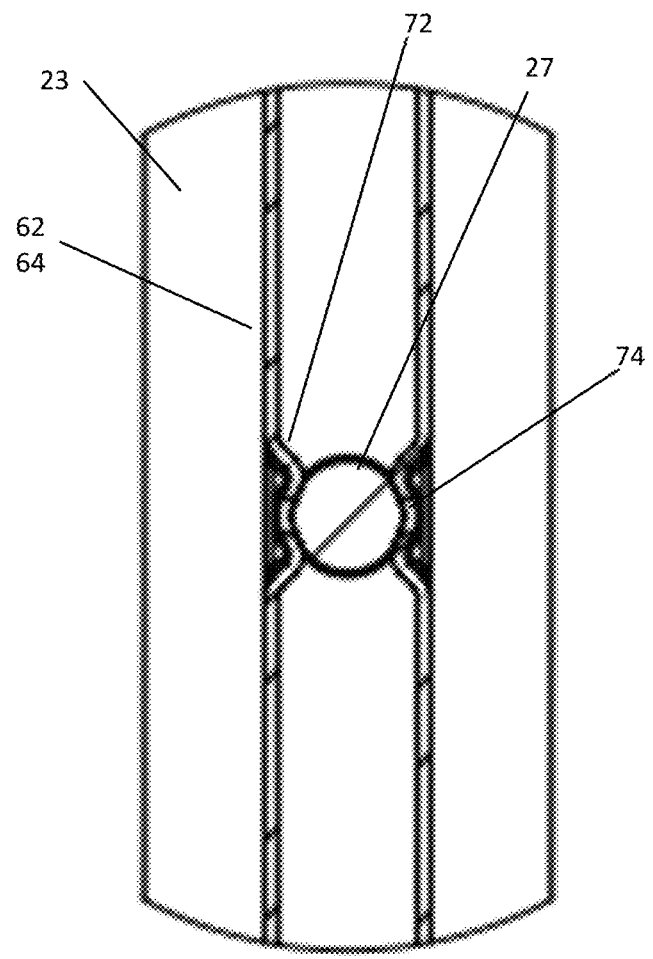
FIG. 32 is a section end view of a exoskeletal swing-gage assembly formed latch assembly. The formed shapes and geometries guide, contain, and secure the longitudinally extending members to the latch assembly upper and lower u-channel.

The at least one formed tab end assembly 46 and the at least one formed latch assembly 44 utilize at least one formed longitudinally extending member guide 72, a metal deformation extending towards the longitudinally extending member with a mating radius to contact the outer surface of longitudinally extending member 27 (FIG. 32). Parallel to the formed radius is the at least one attachment relief 74. The at least one attachment relief 74 is void of material allowing the at least one formed latch assembly 44, or the at least one formed tab end assembly 46 to be welded to the longitudinally extending member. The at least one formed longitudinally extending member guide 72 and the at least one attachment relief 74 are apposing about a central plane to capture the at least one longitudinally extending member 27. The at least one formed longitudinally extending member guide 72 increases structural rigidity of the at least one formed tab end assembly 46 and the at least one formed latch assembly 44 and is commonly produced by a stamping process. The at least one attachment relief 74 is shown as a slot but could be any geometry that supports best assembly and production practices.

The at least one tab 29, which has at least one cutout feature, such as a tab-slot 31 (see FIG. 4). The at least one tab-slot 31 cut features are commonly a slot or round hole but may be any required geometry without departing from the scope of the disclosure. The at least one tab 29 is positioned in the at least one aperture located in the at least one upper u-channel 62, the at least one aperture located in the at least one lower u-channel 64, or at an aperture created by the upper and lower u-channels. The at least one tab 29 is shown as a welded component but could be attached by other methods such as bolting, riveting, crimping, or bonding without departing from the scope of the disclosure. Furthermore, the at least one tab 29 could be positioned and mounted similarly to the at least one formed exoskeletal swing-gate assembly 40.

The at least one upper u-channel 62, the at least one lower u-channel 64 of the at least one formed latch assembly 42 and the at least one form tab end assembly 46. Due to the corrosive nature of confinement barns, the at least one lower u-channel 64 when made with properties of stainless steel improving the quality of the gating system while maintaining a cost value. The at least one upper u-channel 62, the at least one lower u-channel 64 may be combined into a single part and singular material property. The at least one formed upper u-channel 62 and lower u-channel 64 is formed by two relatively parallel planar surfaces of equal length, connected by the at least one radius bend 63 tangent (FIGS. 31 and 35) to the two relatively parallel and apposing planar surfaces.

Figure 33:
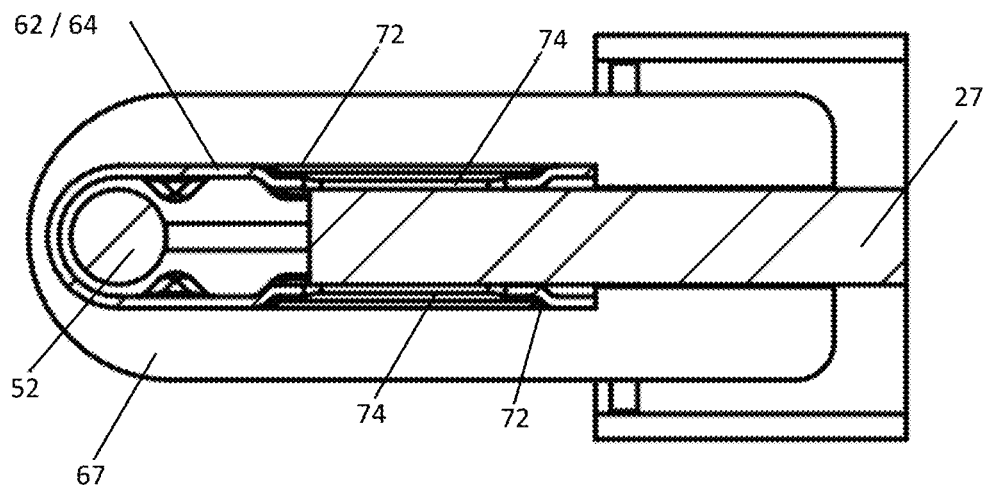
FIG. 33 is a section top view of an exoskeletal swing-gage assembly formed latch assembly. The formed shapes and geometries guide, contain, and secure the longitudinally extending members to the latch assembly.
Figure 34:
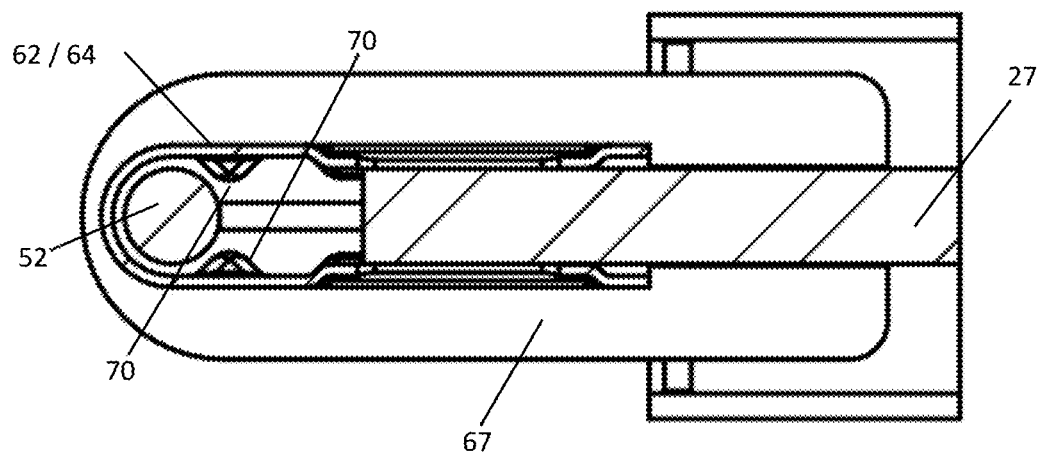
FIG. 34 is a section top view of an exoskeletal swing-gage assembly formed latch assembly. The formed shapes and geometries guide, contain, and secure the hinge pin weldment within the latch assembly.

The at least one radius bend 63 provides a load bearing and guide surface for the at least one upper hinge pin 53 and the at least one lower hinge pin 55 of the at least one hinge pin weldment 50. To retain the at least one hinge pin weldment 50 the at least one formed pin guide 70 and the at least one formed pin guide 70 are apposing about a central plane (FIG. 33). The at least one formed pin guide 70 increases structural rigidity of the at least one formed latch assembly 44 and is commonly produced by a stamping process. The at least one radius bend 63 could be replaced with any surface profile that provides the required load bearing surfaces to support and hinge pin location, guiding, and linear motion of the latching function.

Additionally, both the at least one formed pin guide 70 and the at least one formed longitudinally extending member guide 72 can be added to the at least one formed tab end assembly 46 and the at least one formed latch assembly 44 to increase overall rigidity.

The at least one formed latch assembly 44 constrains the travel of the at least one hinge pin weldment 52 between the at least one bolt and nut 71, and the at least one longitudinally extending member 27.

The at least one disclosed formed exoskeletal swing-gate assembly 42 and the at least one formed exoskeletal fixed-gate assembly 22 with the at least one (1) structurally significant longitudinally extending members 21 are captured and welded in holes of the at least one vertical plate 23 as required by length. The at least one top structural longitudinally extending member 25 is shown as a standard piece of angle iron but may be comprised of any material or geometry required to increase the vertical and lateral strength of the at least one formed exoskeletal fixed-gate assembly 42. The remainder of the at least one longitudinally extending members 27 are typically not structurally significant, are cost driven, and are spaced to prevent animal movement between confinement areas. The at least two (2) structurally significant longitudinally extending members 21 is any geometry, solid or hollow, capable of transferring gate loading to the at least one formed latch assembly 44 and the at least one vertical plate 23 without failure; and spaced vertically at any increment. The at least one vertical plate 23 can include any combination of mounting holes 24 used to secure the at least one formed exoskeletal fixed-gate assembly 42 to additional gates, components, or building structures. Hence forward:

The "fixed gate assembly" is used to represent a fixed gate assembly 20 and a formed exoskeletal fixed-gate assembly 22 and the derivatives thereof;

The "swing-gate assembly" is used to represent a swing-gate assembly 40 and a formed exoskeletal swing-gate assembly 42 and the derivatives thereof;

The "latch assembly" is used represent a latch assembly 50 and a formed latch assembly 44 and the derivatives thereof; and The "u-channel" is used to represent u-channel 61, upper u-channel 62, lower u-channel 64 and the derivatives thereof.

The at least one formed exoskeletal fixed-gate assembly 22 and the at least one formed exoskeletal swing-gate assembly 42 perform as disclosed for latch assembly 50 swing-gate assembly 40 when installed and assembled in a barn 10 using all materials and methods disclosed, without limitation.

Additionally, the at least one bolt and nut 71 improves animal well-being by preventing the at least one hinge pin weldment 52 within the at least one latch assembly 50 from removal and being used to poke or strike animals.

The at least one latch assembly 50 open structure design supports washing and disinfecting to promote animal well-being and biosecurity.

According to one embodiment, the at least one u-channel 61 can be welded to the at least one structurally significant longitudinally extended member 21 if extended through and beyond the at least one vertical plate 23 (not shown).

According to one embodiment, the at least one u-channel 61 can be welded to the at least longitudinally extended member 27 if extended through and beyond the at least one vertical plate 23 (not shown).

The disclosed at least one latch assembly 50 prevents animals, such as pigs, from accidentally opening the at least one swing-gate assembly 40 from either side of.

The disclosed at least one latch assembly 50 minimizes any gaps between the at least one swing-gate assembly 40 and the at least one fixed-gate assembly 20, the at least one wall 11, the at least one feeder 75, and other production gating hardware without the need for additional components.

Figure 9:
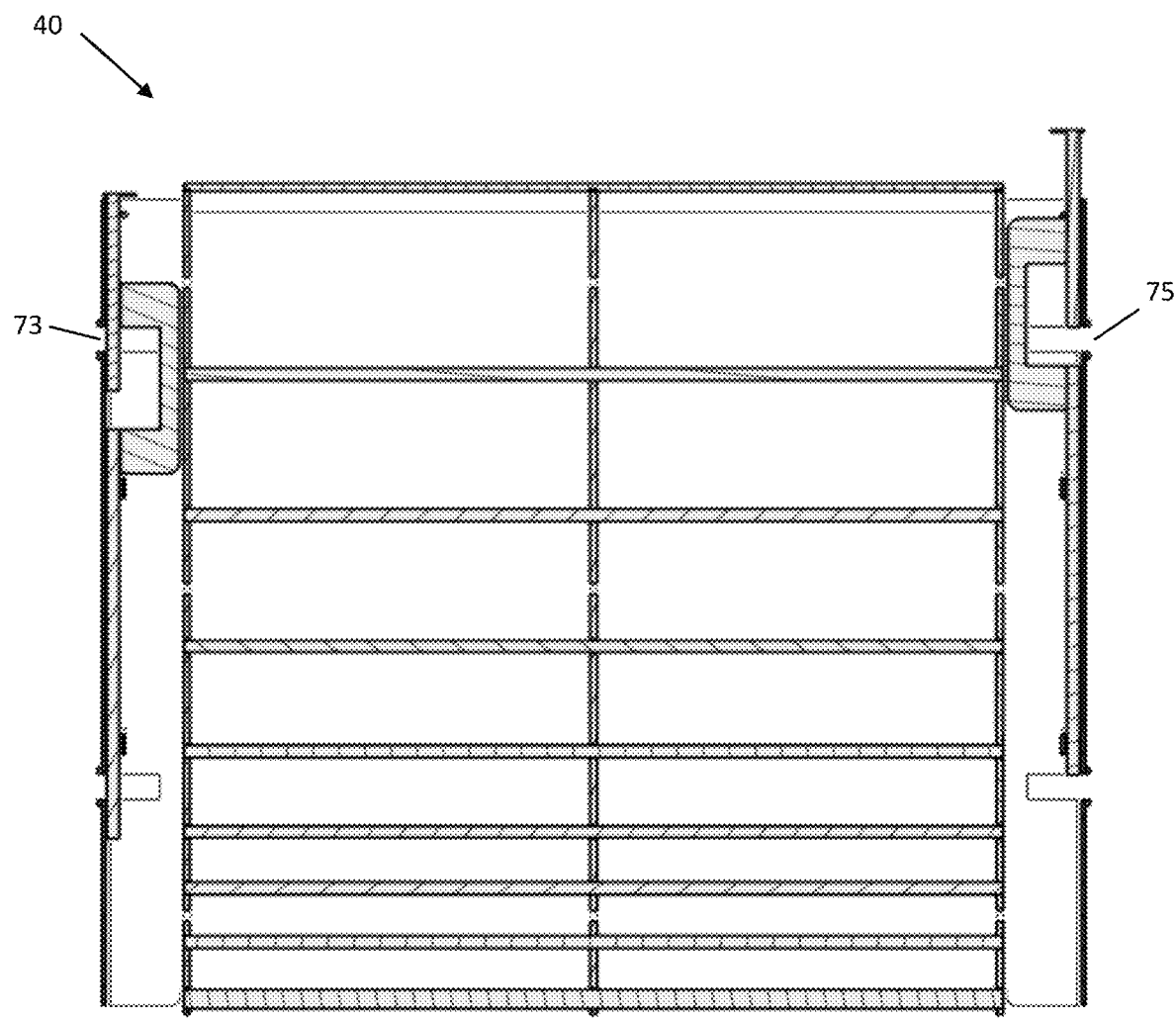
FIG. 9 is a sectioned side view of the internal relationship between the exoskeletal latch assembly and the gate rod assembly in the latched state (left) and unlatched state (right).

The at least one swing-gate assembly 40 and the relationship of the at least one latch assembly 50 and the at least one hinge pin weldment 52 in the at least one latched state 73 and the at least one unlatch state 75 are shown in the cross section of FIG. 9.

The at least one welded swing-gate assembly 40 is configured with at least one vertical plate 23 having at least one tab 29, which has at least one cutout feature, such as a tab-slot 31. The at least one tab-slot 31 cut feature are commonly a slot or round hole but may be any required geometry. The at least one tab 29 is positioned on any side, any of the at least one vertical plate 23, or all of the at least one vertical plate 23 forming a swing-gate assembly 40. The at least one tab 29 is a welded component but could be attached by other methods such as bolting, riveting, crimping, or bonding.

Figure 10A:
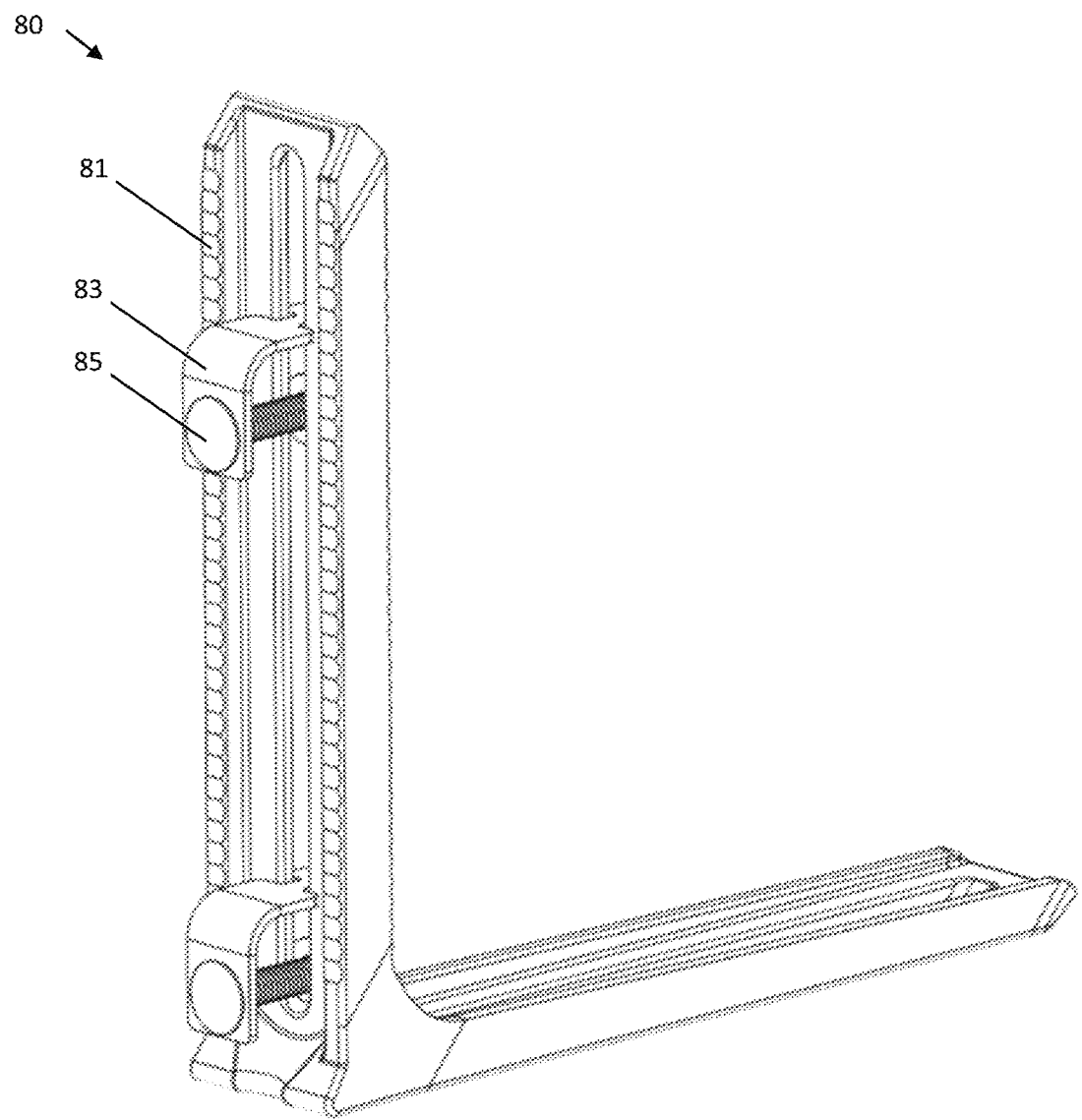
FIG. 10A is a perspective view of the footplate assembly with clamping straps and bolt hardware. Shown are the serrations that help secure the gate to the footplate.

The at least one footplate assembly 80 includes at least one footplate 81, at least one t-strap 83, and at least one bolt, washer, and nut 85 (see FIG. 10A).

Figure 10B:
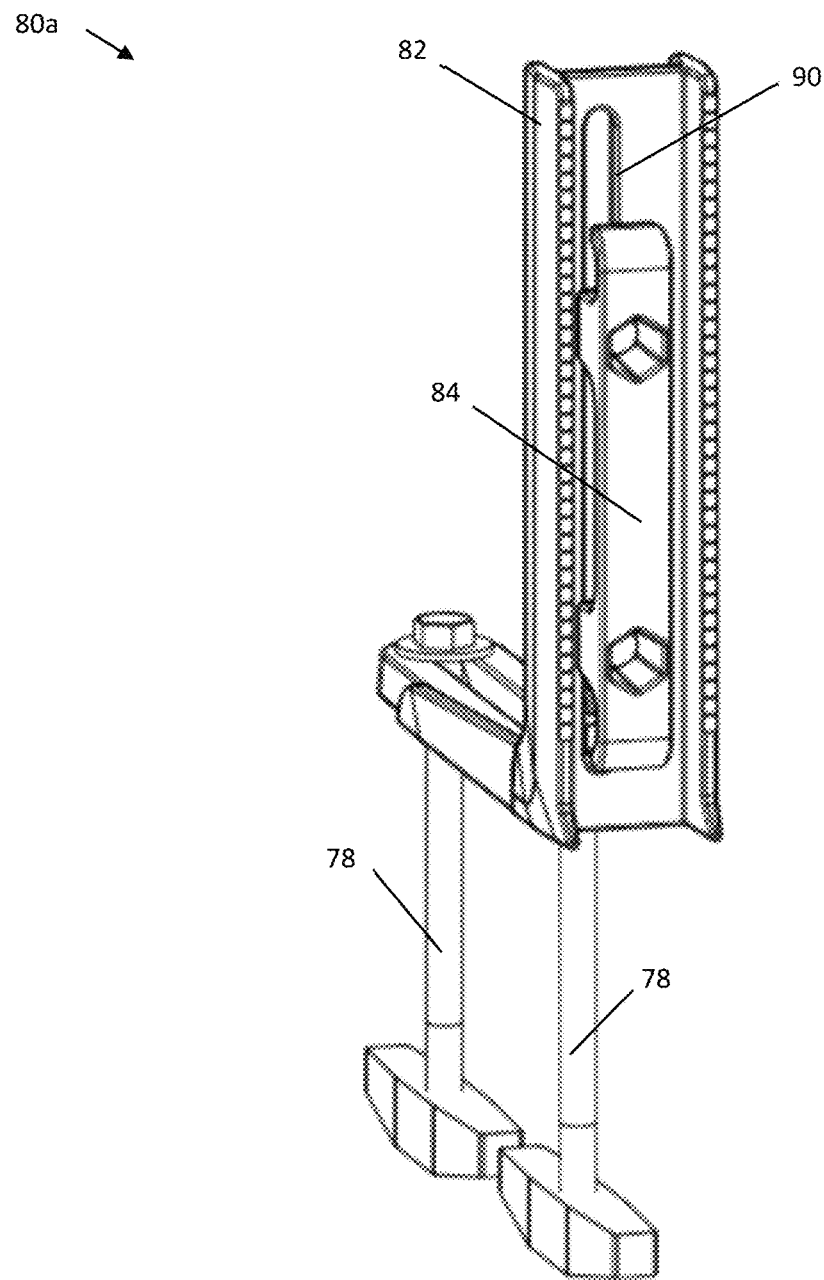
FIG. 10B is a perspective view of a footplate assembly with a cast clamping strap.

The at least one footplate assembly 80a includes at least one footplate 82, at least one cast strap 84, and at least one bolt, washer, and nut 85 not shown (see FIG. 10B). Furthermore, it is disclosed that attachment to the fix gate assembly 20 and the at least one structurally significant longitudinally extending member 21 is with the at least one offset footplate gate slot 90. The at least one offset footplate gate slot 90 allows securing the at least one fixed-gate assembly 20 while spanning the at least one vertical plate 23 (see FIG. 12B).

For proper installation of the at least one footplate assembly 80 to the at least one floor slat panel 13 through the at least one slat floor slot 15 the at least one t-bolt assembly 78 is required, but the most desirable installation comprises at least two (2) t-bolt assemblies 78. The at least one t-bolt assembly 78 is a general reference to methods used to secure gating equipment to the at least one floor slat panel 13 used in housed animal production.

Figure 11:
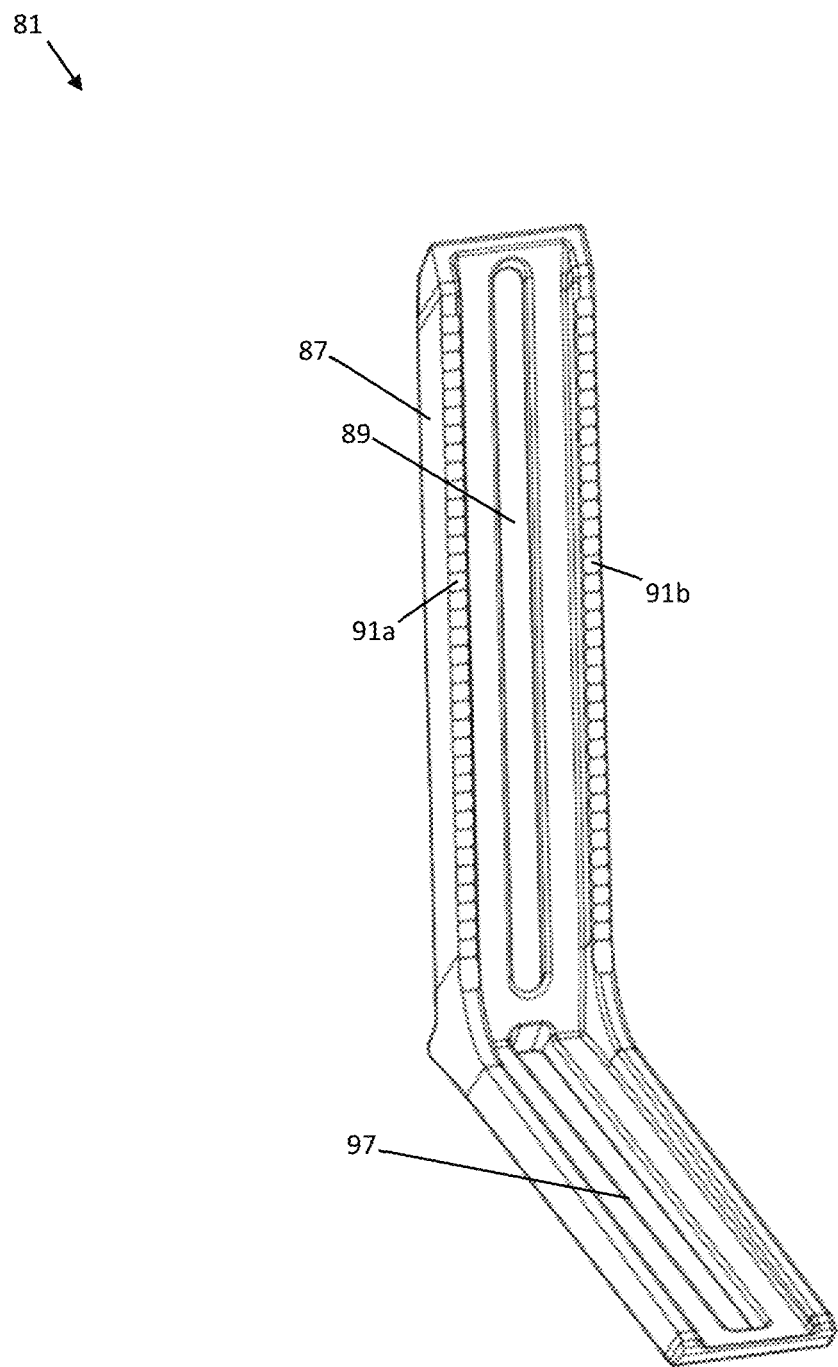
FIG. 11 is a perspective reverse view of FIG. 9 showing the are the reverse serrations that help secure the gate to the footplate.
Figure 12A:
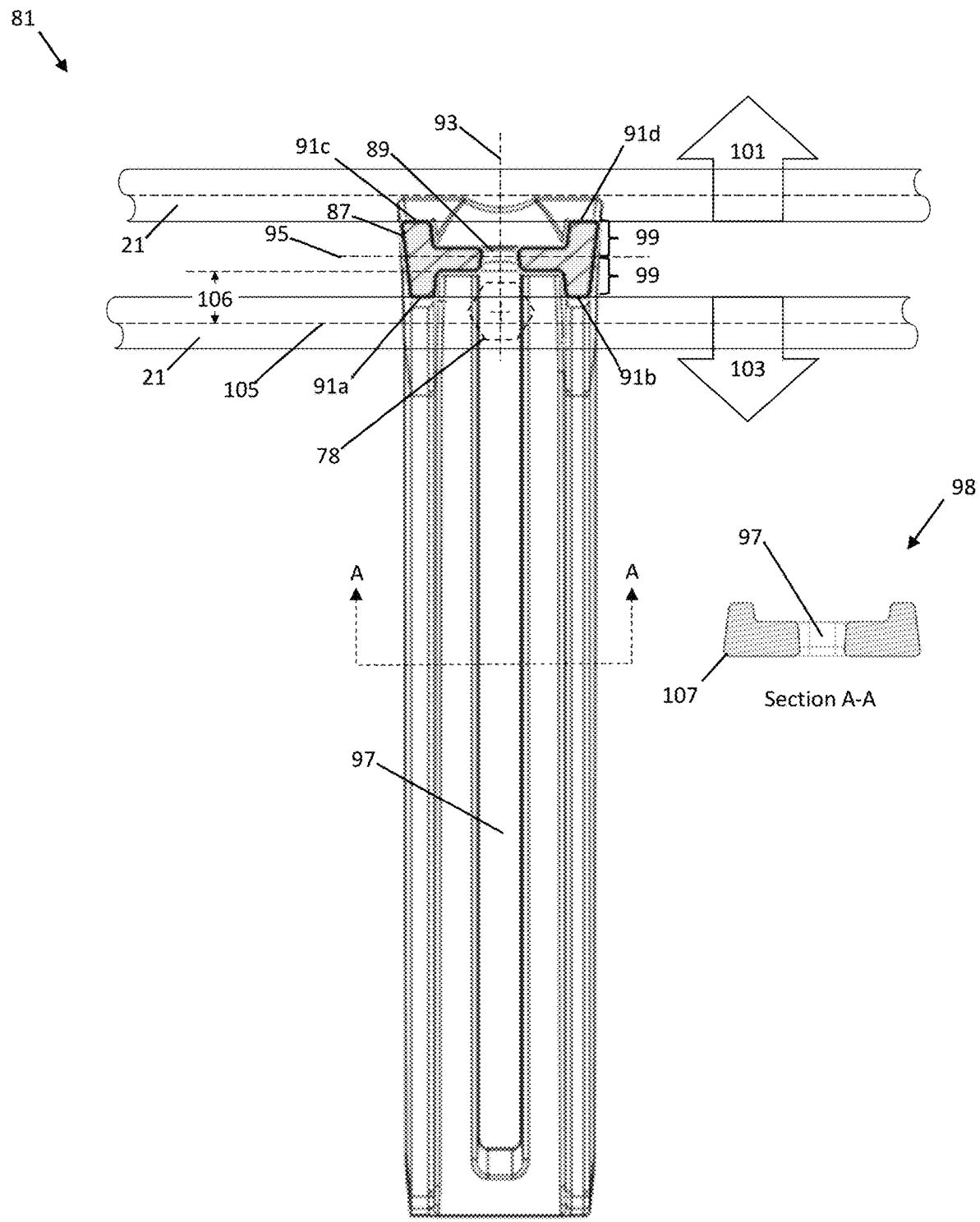
FIG. 12A is a top view of the footplate with section views of both the vertical and horizontal casting profiles.

The at least one footplate 81 (also referred to as "footplate 82" throughout the disclosure, see FIG. 11) is disclosed as a ductile iron casting with at least one H-profile 87 (see FIG. 12A) section profile, and at least one footplate gate slot 89 both extending normal (vertical) to the at least one floor slat panel 13 a distance to allow the minimal clamping range of the at least two (2) structurally significant longitudinally extending members 21 of the at least one fixed-gate assembly 20. The at least one serration 91a is located on the at least one surface of H-profile 87, mirrored about the at least one gate slot axis 93 of the at least one footplate gate slot 89 to create at least one serration 91*b*. The at least one serration 91*a* and 91*b* are mirrored about the H-profile centerline plane 95 to create at least one serration 91*c* and 91*d*. The at least one serrations 91*a*, 91*b*, 91*c*, 91*d* are then patterned the length of the at least one H-profile 87. The length of the H-profile legs 99 protruding normal to the H-profile centerline plane are equal distant allowing to the at least one footplate 81 to be planar 101 or reverse planar mount 103 and not requiring different clamp or bolting hardware.

When mounted in the planar mount 101 orientation, the at least one serration 91*c* and 91*d* contact the at least one structurally significant longitudinally extending member 21. When mounted in the reverse planar mount 103 orientation, the at least one serration 91*a* and 91*b* contact the at least one structurally significant longitudinally extending member 21. The importance of planar 101 and reverse planar mount 103 will be further discussed in the disclosure but significant to solving the problem of no singular mounting solution. The at least one H-profile 87 can be constant, non-linear, or step function profile.

A planar 101 mounting is defined when the at least one footplate 81 is secured to the at least one structurally significant longitudinally extending members 21 extending away from the said axial centerline of the at least one structurally significant longitudinally extending members 21 and the at least one fixed-gate assembly 20. A reverse planar mount 103 is defined when the at least one footplate 81 is secured to the at least one structurally significant longitudinally extending members 21 extending under said axial centerline of the at least one structurally significant longitudinally extending members 21 of the at least one fixed-gate assembly 20. Thus, there are four (4) mounting options to secure the at least one footplate 81 to the at least one fixed-gate assembly 20, two (2) of which are options for planar 101 mounting and two (2) options for reverse planar 103 mounting insuring the at least one footplate 81 can be properly secured to the at least one fixed-gate assembly 20 and at least one slat floor slot 15.

Figure 12B:
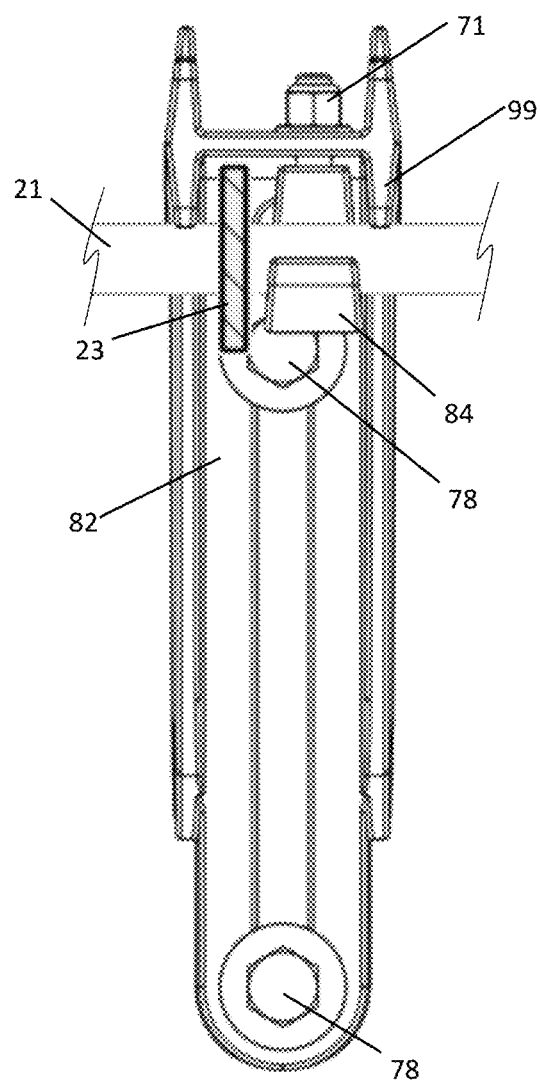
FIG. 12B is a sectioned top view of an offset footplate and cast clamp attached to a fixed-gate assembly spanning a vertical plate.

As disclosed, the length of the at least one H-profile legs 99 is such to allow the at least one vertical plate 23 to be positioned between in either the planar mount 101 or reverse planar mount 103 orientation (see FIG. 12B). This positioning option combined with any location along the at least one structurally significant longitudinally extending member 21 further improves the mounting options and eliminates the requirement for end of gate structures, and design specific gate lengths based on the at least one floor slat panel 13.

The at least one H-profile 87 can be replaced by any geometrical profile that provides the required structural and manufacturable requirements for the functional requirements without departing from the scope of the disclosure.

The at least one footplate gate slot 89 is secured to the at least one fixed-gate assembly 20 by securing to the at least one structurally significant longitudinally extending member 21 with at least one gate clamp 83. The vertical positioning of the at least one fixed-gate assembly 20 is assisted with the at least one serration 91*a*, 91*b*, 91*c* or 91*d* which has at least one surface tangent to the outer profile of the at least one structurally significant longitudinally extending member 21. The at least one H-profile legs 99 being equal distance about the extruded vertical structure, the at least one t-strap 83 is used in either planar mount 101 or reverse planar mount 103 mounting orientation. The at least one gate clamp 83 has a t-tab that is inserted and rotated in the at least one gate slot 89, and a hex or carriage bolt, flat washer and nut 85 are installed and tightened, constraining all degrees of gate movement, lateral, vertical, and rotational about the at least one structurally extending member 21.

The at least one footplate floor slot 97 and floor slot casting profile 98 extend parallel to the at least one floor slat panel 13 allows for securing the at least one footplate 81 with at least one t-bolt assembly 78 through the at least one floor slat slot 15. The at least one floor slot 97 must allow the installation of the at least one t-bolt assembly 78, whereas the bolt axis of rotation centerline is between the at least one structurally significant longitudinally extending member centerline 105 and the vertical face of the H-profile 87 defined as the under gate t-bolt zone 106. The required minimal distance of the at least one floor slot 97 is 1.5× the centerline distance between two consecutive floor slat slots 15. This insures the securing of the at least one footplate 81 to the at least one floor slat panel 13 floor slat slot 15 and a second and parallel floor slat slot 15. Thus, the at least one footplate assembly 80 is secured to the floor slat panel 13 with at the at least two (2) t-bolt assemblies 78, when the at least one gate assembly 20 is mounted directly above and parallel to the at least one floor slat slot 15 and the at least one footplate 81 is mounted in the reverse planar mounting orientation 103. Without the at least one footplate floor slot 97 extending under the at least one structurally significant longitudinally extending member 21 in to the under gate t-bolt zone 106 the fixed-gate assembly would be secured with only a single bolt, which is not desirable, or the addition of the at least one foot plate 81 in an at least one footplate tandem mount 109 orientation is required, which increases floor space required and cost.

Figure 13:
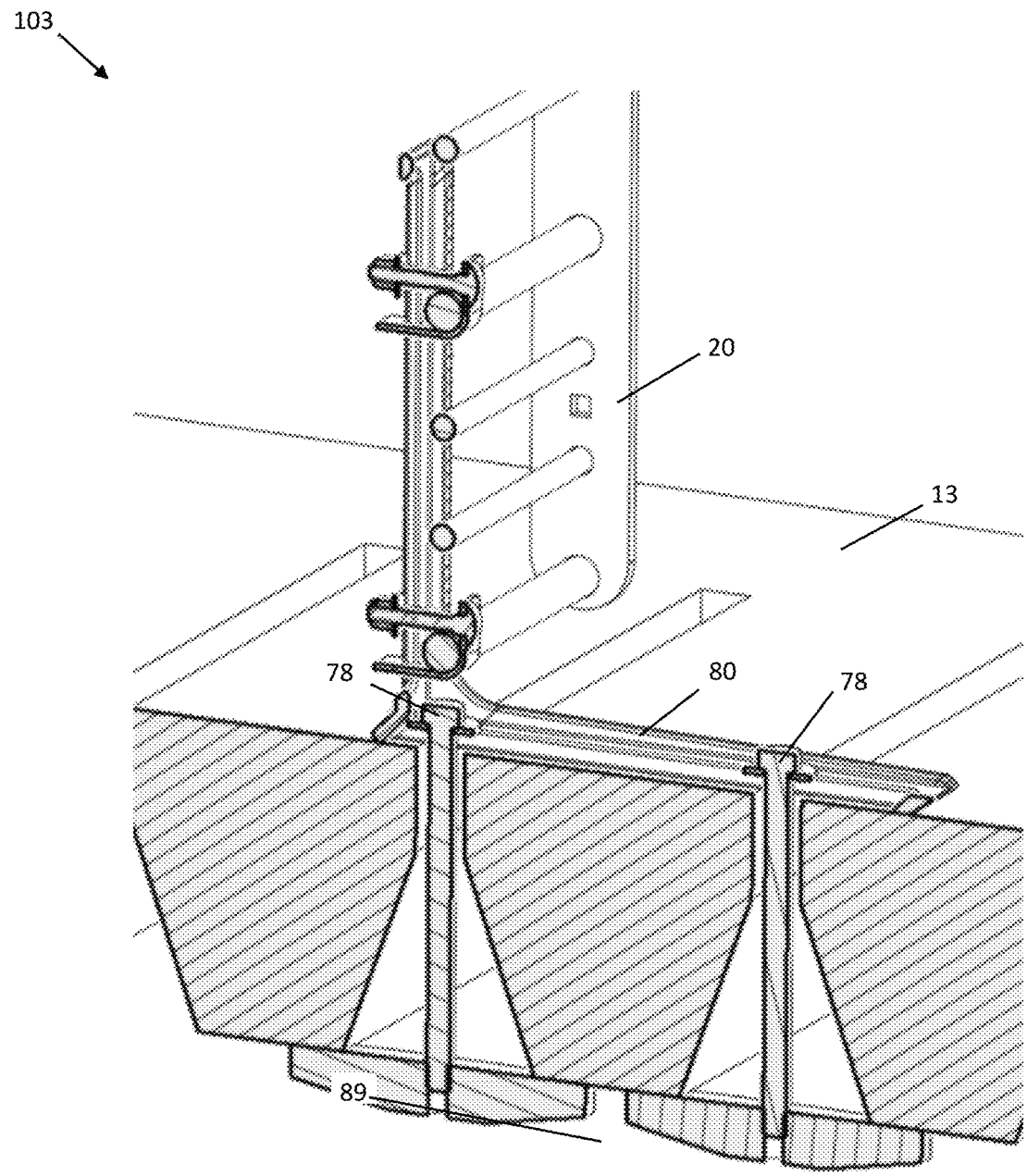
FIG. 13 is a sectioned prospective view of the footplate mounted to the fixed-gate assembly in a reverse planar mount. The view illustrates the below the gate t-bolt installation when the gate is positioned directly above a floor slat slot.

FIG. 13 shows a sectional view of the at least one reverse planar mount 103 orientation of the at least one footplate assembly 80, connected to at least one fixed-gate assembly 20, the at least one floor slat panel 13 with the at least two (2) t-bolt assemblies 78. In this configuration, the gate is secured and can withstand the forces applied by animals to the gate.

The at least one footplate gate slot 89 and H-profile 87 must be of sufficient structure to prevent failure.

The at least one footplate gate slot 89 and H-profile 87 must have smooth profiles and edge radius to promote animal well-being.

The at least one footplate floor slot 97 and floor slot casting profile 107 must be of sufficient structure to prevent failure.

The at least one footplate floor slot 97 and floor slot casting profile 107 must have smooth profiles and edge radius to promote animal well-being.

The at least one footplate gate slot 89 and the at least one footplate floor slot 97 is open or closed slots.

The at least one footplate floor slot 89 and floor slot casting profile 107 must be of sufficient width so when used in an installation parallel to the at least one floor slat slot 15 it will span the width of with sufficient supporting surface area.

The at least one footplate 81 is vertically adjustable relative to the at least one structurally significant longitudinally extending member 21 to compensate for floor height variations. The floor variation due to sagging of the at least one floor slat panel 13 between floor span supports is common in older barns.

The at least one footplate floor slot 89 and floor slot casting profile 107 are disclosed as symmetrical but can be any dimensional relationship.

The at least one footplate gate slot 89 and H-profile 87 are disclosed as symmetrical but can be any dimensional relationship.

Ductile iron cast parts are proven to meet structural requirements; sufficiently resistant to the corrosive biowaste environment; elimination of stress concentration associated with failure or poor performance; eliminates waste associated with plate fabrication techniques, which are especially costly in stainless steel welded assemblies; supports high volume production; is cost effective; and eliminates all sharp edges associated with thermal cutting and shearing processes which may, and have had adverse effects on animal well-being.

Figure 14:
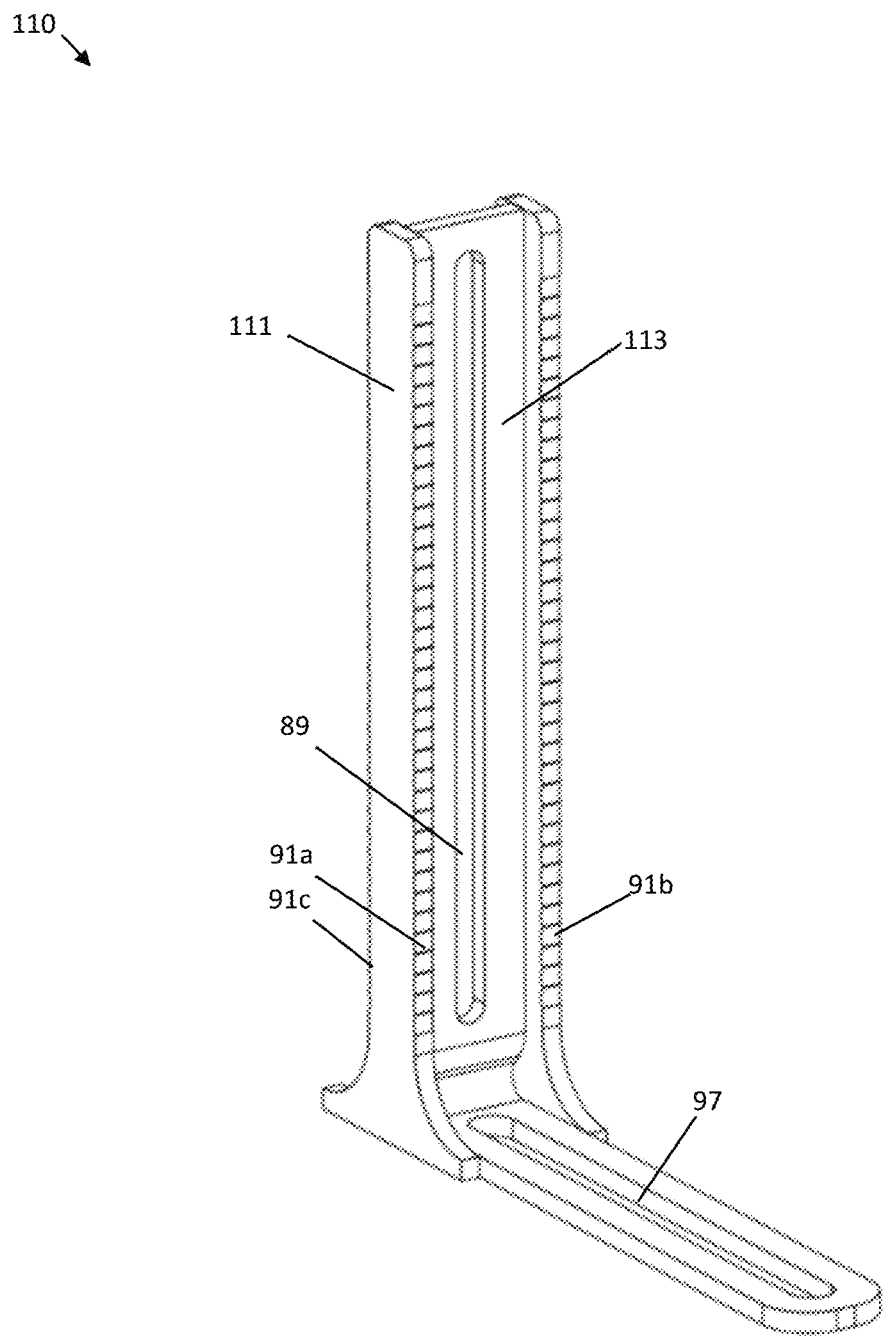
FIG. 14 is a footplate weldment assembly.

Furthermore, this disclosure provides a method of forming the at least one welded footplate assembly 110 according to the many possible configurations (see FIG. 14). The at least one welded footplate assembly 110 is typically formed by thermal cut parts that are planar, planar and bent, and then welded to for the similar geometry and function disclosed in the at least one footplate 81 ductile iron casting. The at least one side plate 111, and at least one formed center plate 113 containing at least one gate slot 89 extending normal (vertical) to the at least one floor slat panel 13 a distance to allow the clamping to the at least two (2) structurally significant longitudinally extending members 21 of the at least one fixed-gate assembly 20. The at least one serration 91*a* is located on the at least one side plate 111, mirrored about a plane located on the centerline of the at least one gate slot 88 to create at least one serration 91*b*. The at least one serration 91*a* and 91*b* are mirrored about formed center plate 113 mid-plane to create at least one serration 91*c* and 91*d* (not shown). The at least one serrations 91*a*, 91*b*, 91*c*, 91*d* are then patterned the length of the at least one side plate 111. The combining of the at least one side plate 111 and the at least one formed center plate 113 form a H-structure with at least one H-profile legs 99 that the at least one serration 91*a*, 91*b*, 91*c* or 91*d* are equal distant from the H-plane centerline plane 95, thus allowing to the at least one footplate 81 to be planar mount 101 and reverse planar mount 103 as previously disclosed in the cast configuration of the disclosure. The at least one formed center plate 113 creates the same floor plate slot 97 capabilities as presented in prior cast footplate 81 disclosure. Specifically, when mounted in the reverse planar mount, the foot plate floor slot 97 length and positioning allows for the at least one t-bolt assembly 78 to be positioned in the under gate bolt zone 106 and longitudinally extending for the at least one t-bolt assembly 78 to secured to an additional parallel floor slat slot 15. Unlike the at least one footplate 81, the at least one footplate welded assembly 110, has lower production rates, excessive material losses due to scrap, and sharp edges that could cause injury to the housed animals. Both would provide the identical solution to the formal problem statement. There could be additional variations, based on this disclosure. The importance of being able to reverse planar mount will be further discussed in the disclosure but is required to solve the current problem of no universal mounting solution.

The at least one H-profile legs 99 that the at least one serration 91*a*, 91*b*, 91*c* or 91*d* do not have to be equal distant, parallel, or mirrored about the at least one H-plane centerline plane 95 of the at least one footplate 81 or the at least one welded footplate assembly 110. The at least one H-profile legs 99 that the at least one serration 91*a*, 91*b*, 91*c* or 91*d* do not have to be equal distant, parallel, or mirrored about the at least one gate slot axis 93 of the at least one footplate 81 or the at least one welded footplate assembly 110.

Figure 15:
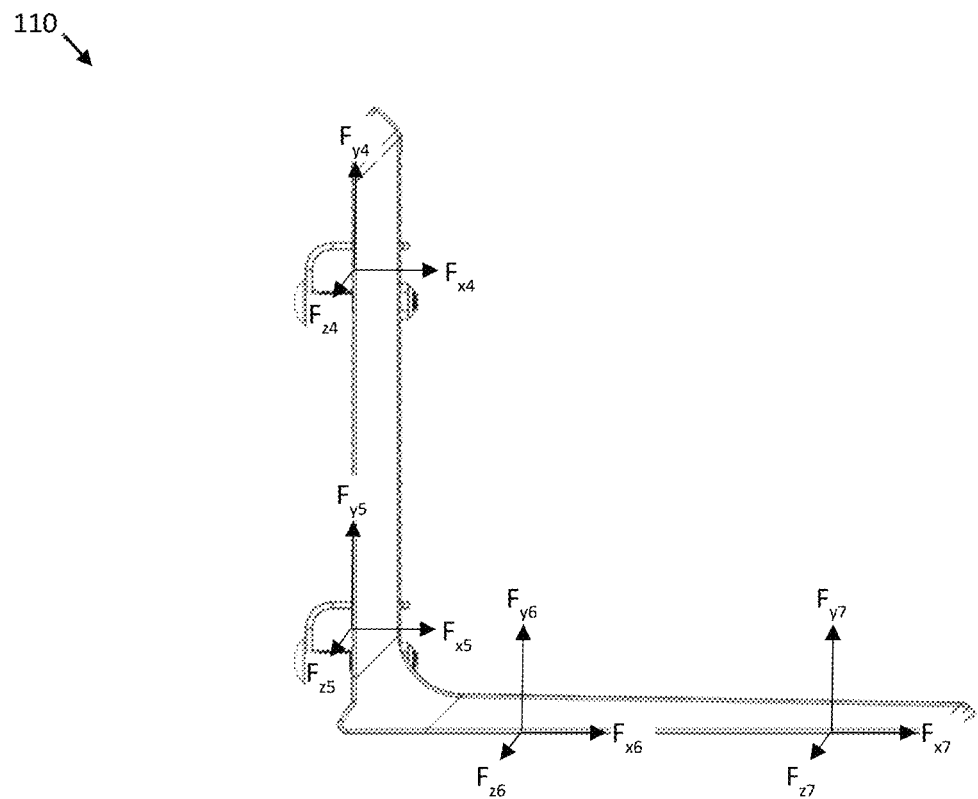
FIG. 15 is a side view of a footplate and the force components from a mounted gate and t-bolt anchors to the floor slat.

The at least one fixed-gate assembly 20 is defined as a rigid body which transfers the at least one animal force applied components $F_{x1}$, $F_{y1}$, $F_{z1}$ to the at least one structurally significant longitudinally extending member component forces $F_{x2}$, $F_{y2}$, $F_{z2}$ and structurally significant longitudinally extending member component forces $F_{x3}$, $F_{y3}$, $F_{z3}$ located at any position along the at least one structurally significant longitudinally extending members 21 (see FIG. 3). When connected to the at least one footplate 81, the at least footplate equal and opposite component forces $F_{x4}$, $F_{y4}$, $F_{z4}$ and footplate component opposite forces $F_{x5}$, $F_{y5}$, $F_{z5}$ transfer loading through the at least one footplate 81, assumed a rigid body, to the at least one footplate t-bolt component forces $F_{x6}$, $F_{y6}$, $F_{z6}$ and footplate t-bolt component forces $F_{x7}$, $F_{y7}$, $F_{z7}$ at the securing locations of the at least one t-bolt 78 (see FIG. 15).

The at least one fixed-gate assembly 20 is orientated parallel to the at least one slat floor slot 15. Furthermore, there are two positions which can be utilized: 1) the at least one fixed-gate assembly 20 is positioned directly above the at least one slat floor slot 15 (see FIG. 16), and 2) the at least one fixed-gate assembly 20 is positioned equally between two slat floor slots 15 (see FIG. 17). The at least one fixed-gate assembly 20 may also be mounted perpendicular to the at least one slat floor slot 15 (see FIG. 18). It is noted that the at least one fixed-gate assembly 20 could be mounted in any angular orientations to the at least one floor slat panel 13. The at least two (2) structurally significant longitudinally extending members 21, when secured to the footplate assembly 80, prevent rotation about the axis of the at least one structurally significant longitudinally extending member 21 maintaining the fixed-gate assembly 20 normal to the at least floor slat panel 13. The flexibility of the mounting position of the at least one footplate assembly 80 eliminates all constraints on fixed-gate assembly 20 lengths. Furthermore, a more robust gating solution is achieved with the simple installation of additional footplate assemblies 80 or more equal spacing along a gate line, no longer constrained by a requirement for t- or square-posts at the at least one fixed-gate assembly 20 end connections.

Figure 16:
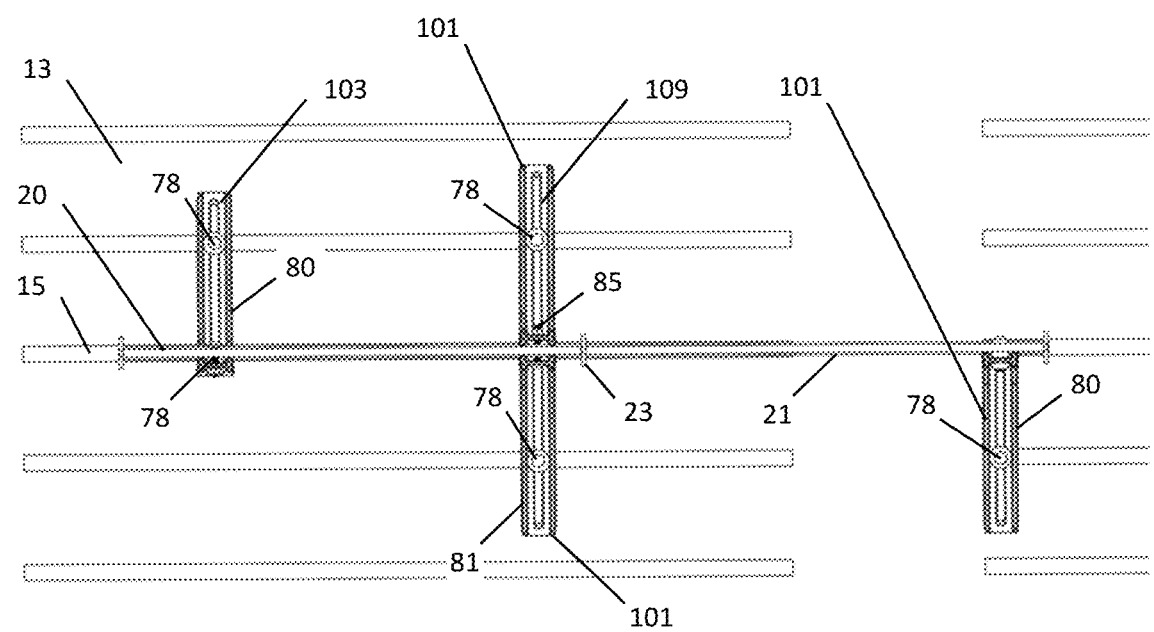
FIG. 16 is a top view of a fixed-gate mounted above and parallel to the floor slat slot and the footplate position options and the number of t-bolts that can connect to the floor slat.

In FIG. 16, the at least one fixed-gate assembly 20 (top structural longitudinally extending member 25 removed) is shown installed directly above the at least one slat floor slot 15, and at least three options for securing to the at least one floor slat panel 13 are presented. These options include the following: 1) securing the at least one floor slat panel 13 to the at least one footplate planar mount 101, 2) securing the at least one floor slat panel 13 to the at least one footplate reverse planar mount 103, and/or 3) securing the at least one floor slat panel 13 to the at least one footplate tandem mount 109. All mounting orientations are secured to the at least one floor slat panel 13 with the at least one t-bolt assembly 78. Furthermore, the at least one footplate tandem mount 109 comprises two apposing footplates 81 which are compressed to the at least one structurally significant longitudinally extending member 21 using the at least one bolt, washer, and nut 85. The at least one footplate tandem mount 109 is secured to the at least one floor slat panel 13 with the at least one t-bolt assembly 78. The at least one footplate planar mount 101 and the at least one footplate reverse planar mount 103 is mountable to either side of the at least one fixed-gate assembly 20. The at least one footplate 81 is positioned at any location along the at least one structurally significant longitudinally extending member 21 horizontally or vertically in best proximity to the at least one vertical plate 23 and the at least one floor slat slot 15, in order to compensate for any uneven floor conditions. The at least two structurally significant longitudinally extending members 21, when secured to the footplate assembly 80, prevent rotation about the axis of the at least one structurally significant longitudinally extending member 21 which maintains the fixed-gate assembly normal to the at least one floor slat panel 13. The flexibility of mounting position of the at least one footplate assembly 80 eliminates all constraints on fixed-gate assembly 20 lengths. The at least one footplate assembly 80 does not need to be positioned at the joint of the at least one fixed-gate assembly 20. Furthermore, a more robust gating solution is achieved with the simple addition of the at least one footplate assembly 80. In one embodiment, the at least one footplate assembly 80 is spaced more equally along a gate line improving the gate installation quality. The at least one fixed-gate assembly 20 and the at least one footplate assembly 80, in any configuration 101/103/109 eliminates the need to design gate joints at locations so as to install historical posts, t-posts and/or a large footplate to correctly intersect the at least one floor slat slot 15 at locations where the at least one t-bolt assembly 78 is installed.

Figure 17:
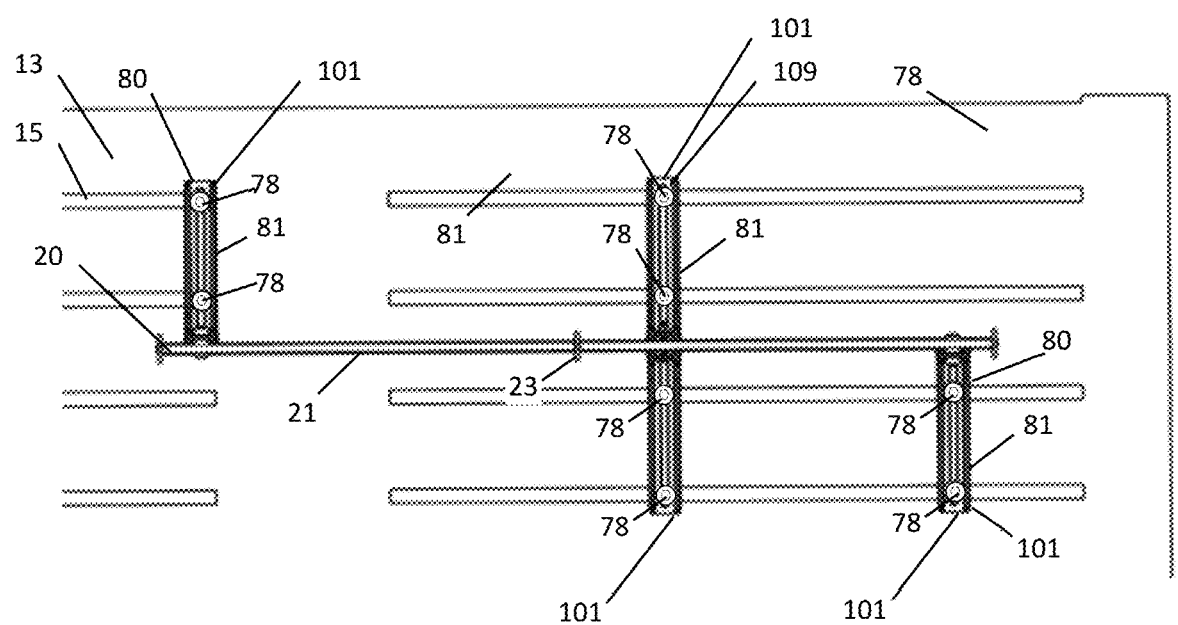
FIG. 17 is a top view of a fixed-gate mounted above, parallel, and between two floor slat slots and the footplate position options and the number of t-bolts that can connect to the floor slat.

In FIG. 17, the at least one fixed-gate assembly 20 (top structural longitudinally extending member 25 removed) is shown installed directly between the at least two floor slat slots 15. There are at least two options for securing the at least one fixed-gate assembly 20 to the at least one floor slat panel 13 which include the following: 1) securing the at least one fixed-gate assembly 20 to the at least one footplate planar mount 101 on either side of the at least one fixed-gate assembly 20, or 2) securing the at least one fixed-gate assembly 20 to the at least one footplate tandem mount 109. All mounting orientations are secured to the at least one floor slat panel 13 with the at least one t-bolt assembly 78. The at least one footplate 81 is positioned at any location along the at least one structurally significant longitudinally extending member 21 in a horizontal or vertical manner in order to provide the best proximity to the at least one vertical plate 23 and the at least one floor slat slot 15, and compensate for any uneven floor conditions. The at least two structurally significant longitudinally extending members 21, when secured to the footplate assembly 80, prevent rotation about the axis of the at least one structurally significant longitudinally extending member 21 maintaining the fixed-gate assembly normal to the at least one floor slat panel 13. The flexibility of mounting position of the at least one footplate assembly 80 eliminates all constraints on fixed-gate assembly 20 lengths. The at least one footplate assembly 80 does not need to be positioned at the joint of the at least one fixed-gate assembly 20. Furthermore, a more robust gating solution is achieved with the simple addition of the at least one footplate assembly 80. The at least one footplate assembly 80 is spaced more equally along a gate line improving the gate installation quality. The at least one fixed-gate assembly 20 and the at least one footplate assembly 80 in any configuration 101, 103, and 109 eliminates the need to design gate joints at locations so as to install historical posts, t-posts, and a large footplate correctly intersect the at least one floor slat slot 15 at locations where the at least one t-bolt assembly 78 is installed.

Figure 18:
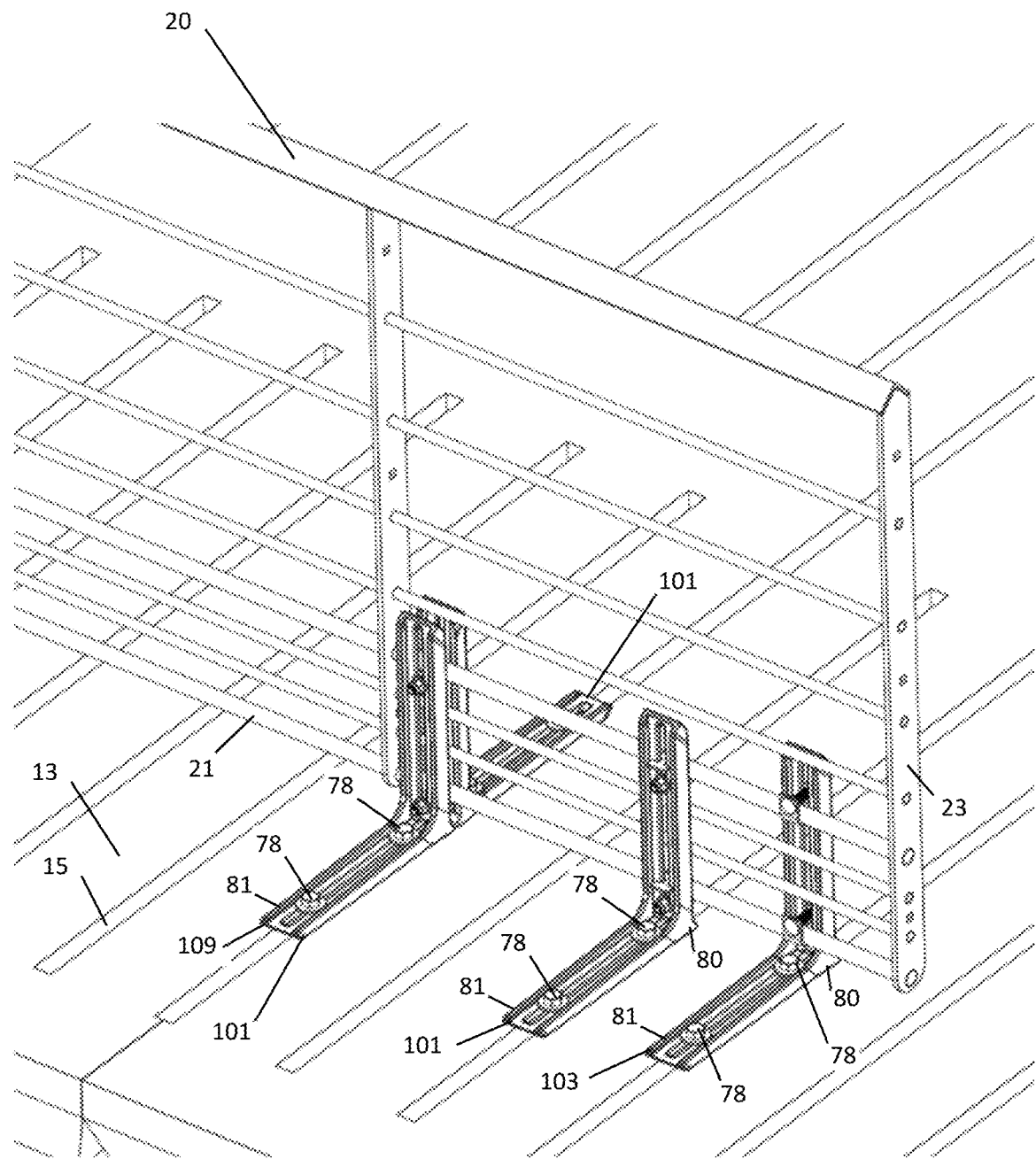
FIG. 18 is a perspective view of a fixed-gate assembly, perpendicular to the floor slat slots and footplate mounting options.

In FIG. 18, a barn gating assembly 120 the at least one fixed-gate assembly 20 is installed perpendicular to the at least one slat floor slot 15. The at least one fixed-gate assembly 20 may be installed perpendicular to the at least one floor slat slot 15 with any of the following methods: 1) the at least one footplate planar mount 101, 2) the at least one footplate reverse planar mount 103, and/or 3) the at least one footplate tandem mount 109. The at least one footplate planar mount 101 and the at least one footplate reverse planar mount 103 are mountable to either side of the at least one fixed-gate assembly 20. The at least one footplate 81 may be positioned at any location along the at least one structurally significant longitudinally extending member 21, horizontally or vertically, in best proximity to the at least one vertical plate 23 and the at least one floor slat slot 15, and compensate for any uneven floor conditions. The flexibility of mounting position of the at least one footplate assembly 80 eliminates all constraints on fixed-gate assembly 20 lengths. The at least one footplate assembly 80 does not need to be positioned at the joint of the at least one fixed-gate assembly 20. Furthermore, a more robust gating solution is achieved with the simple installation of additional footplate assemblies 80 or more equal spacing along a gate line. The at least one fixed-gate assembly 20 and the at least one footplate assembly 80, in any configuration 101/103/109 eliminates the need to design gate joints at locations so as to install historical posts, t-posts, and a large footplate to correctly intersect the at least one floor slat slot 15 at locations where the at least one t-bolt assembly 78 is installed.

All components including, but not limited to, floor slat panels 13, fixed-gate assemblies 20, structurally significant longitudinally extending members 21, vertical plates 23, longitudinally extending members 27, and swing-gate assemblies 40 are comprised of steel, ductile iron, or stainless steel. However, all components may be made with any material, combination of materials, or material and coating combinations that provide the required strength, animal welfare, and service life requirements without departing from the scope of the disclosure.

The physical dimensions, such as length, width, height, or material thickness, of all components may be altered to optimize any or all performance criteria without departing from the scope of the disclosure.

Figure 19:
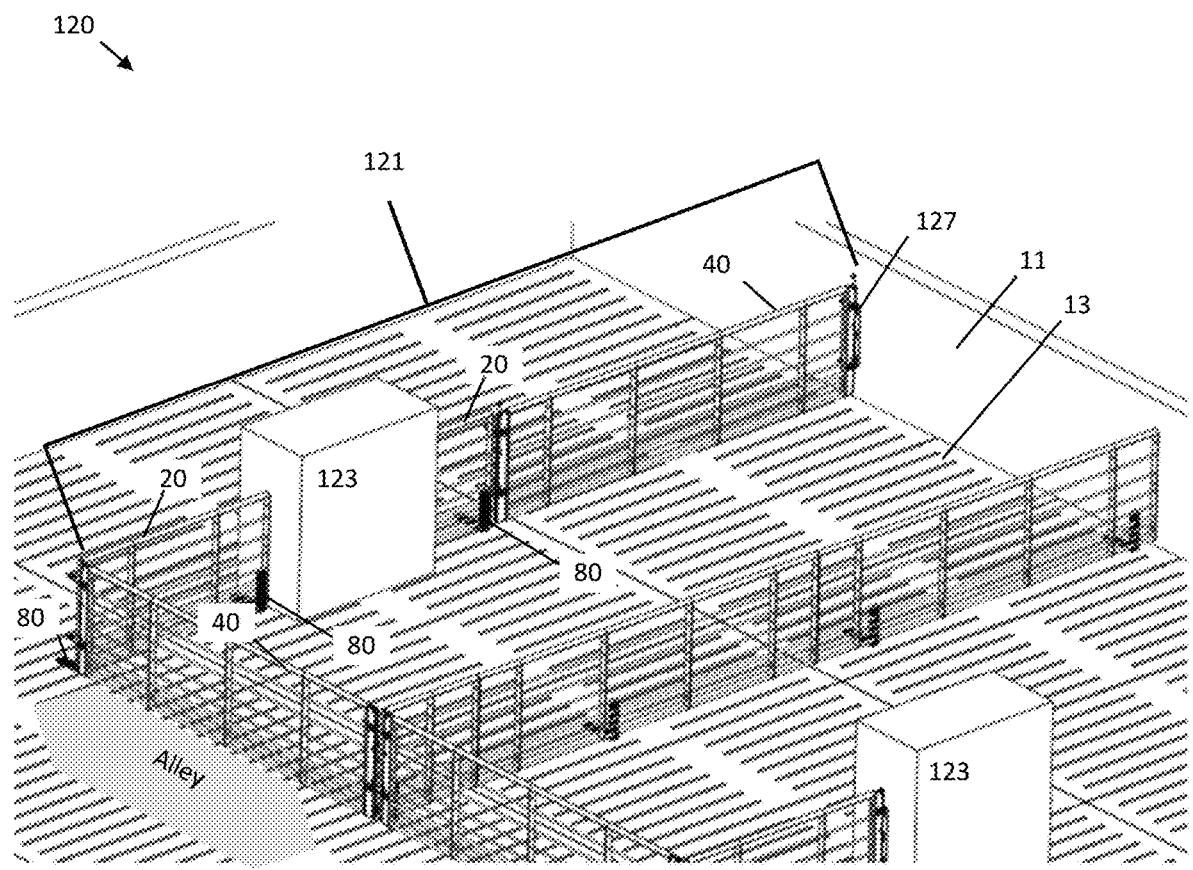
FIG. 19 is a perspective view of the typical gate combinations to create a feeder line, which is a series of gate combinations including a feeder to divide a barn into confinement area.

Furthermore, it should be noted, in one arrangement, the gating system comprises at least one feeder line 121 (see FIG. 19). The feeder line 121 may comprise any combination of components including, but not limited to, at least one fixed-gate assembly 20, at least one swing-gate assembly 40, at least one footplate assembly 80, at least one feeder 123, at least one floor slat panel 13, and at least one wall 11. As a result, an infinite number of gating combinations and orientations are possible without departing from the disclosure.

Figure 20:
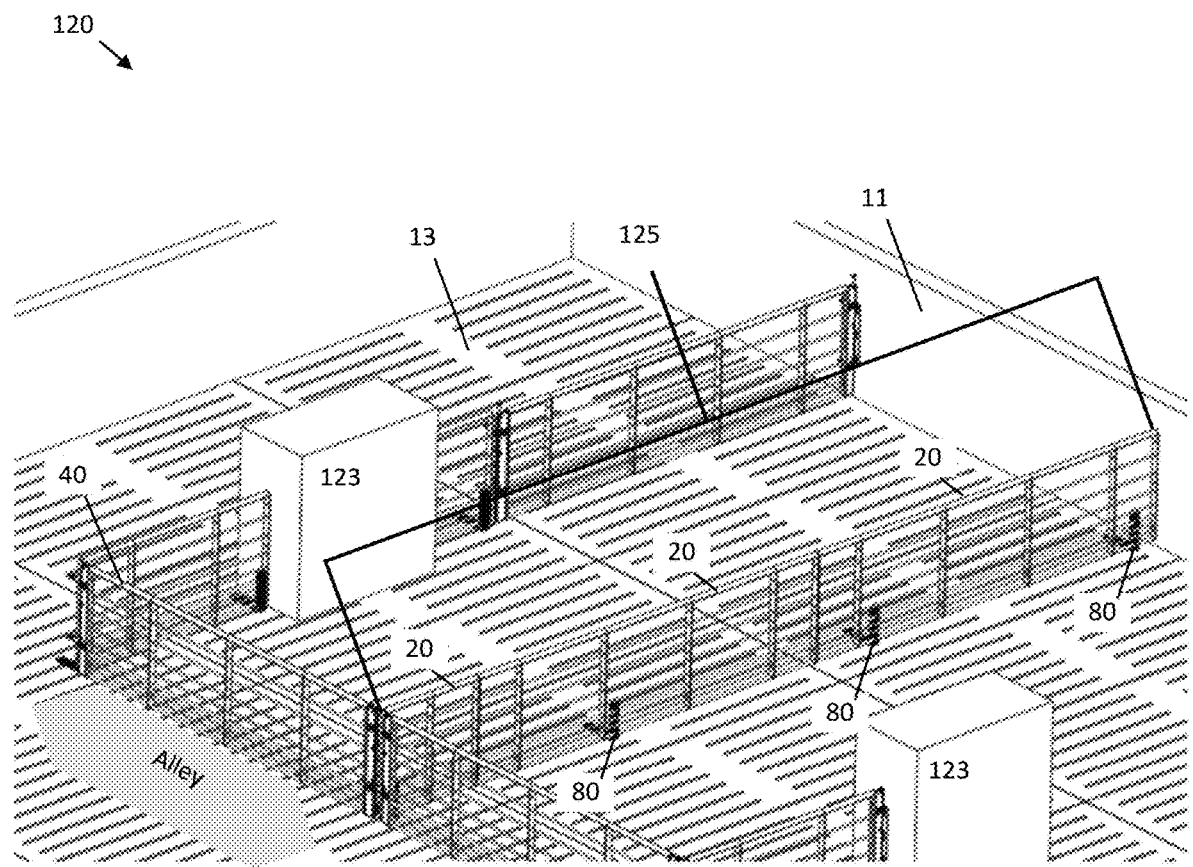
FIG. 20 is a perspective view of the typical gate combinations to create a divider line, which is a series of gate combinations to divide a barn into confinement areas.

In one arrangement, the gating system comprises at least one divider gate line 125 (see FIG. 20). The divider gate line 125 may comprise any combination of components including, but not limited to, at least one fixed-gate assembly 20, at least one footplate assembly 80, at least one floor slat panel 13, and at least one wall 11. As a result, an infinite number of gating combinations and orientations are possible without departing from the disclosure.

The at least one feeder line 121 and the at least one divider gate line 125 are connected by the at least one wall 11, and the at least one swing-gate 40 to form a pen. The at least one swing-gate 40 in conjunction with opposing pen or wall forms an alley to move animals in and out and about the facility. As previously stated, the at least one swing-gate 40 can swing clockwise or counter-clockwise about either end of the gate.

Figure 21:
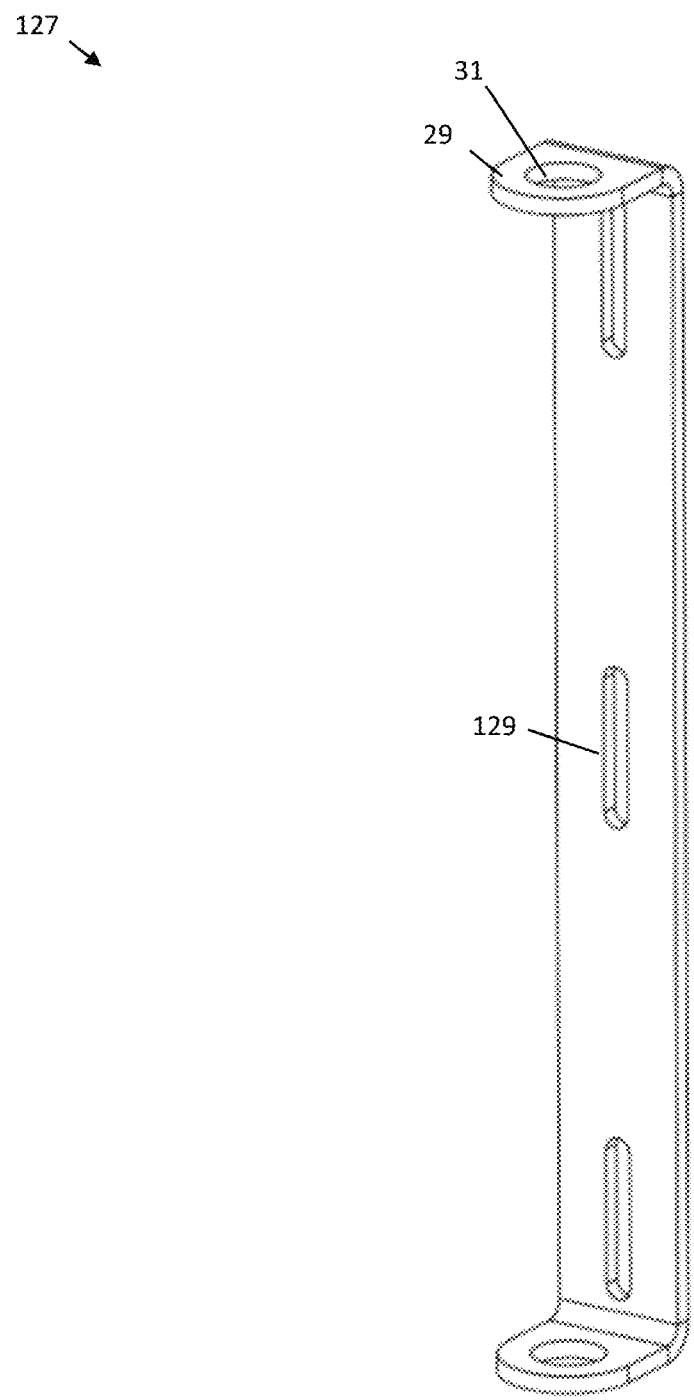
FIG. 21 is a perspective view of a c-bracket used to connect swing-gates to other structures.

In one arrangement, as shown in FIG. 21, the at least one c-bracket 127 has at least one tab 29 which is bent or welded to a plate with the at least one tab-slot 31 and the at least one c-bracket slot 129. The at least one c-bracket 127 is mounted to the at least one wall 11, the at least one feeder 123, the at least one fixed-gate assembly 20, the at least one swing-gate assembly 40, or any other element within a barn 10 to provide a location to secure to the at least one latch assembly 50.

Figure 22:
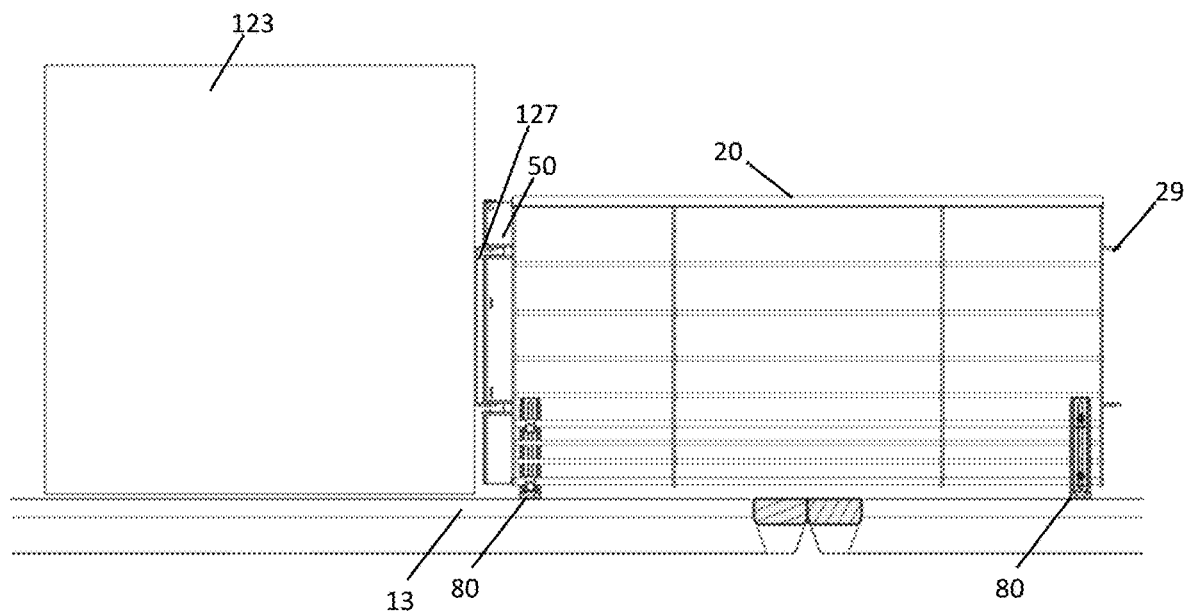
FIG. 22 is a side view of a fixed-gate that provides both tabs for a swing-gate assembly and has a latch connected to the feeder; wherein, the latch assembly is released and the feeder removed for repair or cleaning.

In one arrangement, as shown in FIG. 22, the at least one fixed-gate assembly 20 is configured with the at least on tab 29 and the at least one latch assembly 50 to create a gate that provides a pivot point for the at least one swing-gate 40 (not shown) about the at least one tab 29, and a feeder c-bracket. A feeder c-bracket is the combination of the at least one latch assembly 50 and the at least one c-bracket 127. The at least one feeder 123 is rigidly mount to the at least one floor slat panel 13 or mounted to a gate with a means to release it for service or cleaning. The addition of the at least c-bracket 127 bolted to the feeder 123 allows the feeder 123 to be secured to or removed from the at least one feeder gate line 121 with the at least one latch assembly 50. This demonstrates the versatility of the at least one latch assembly 50, eliminating the need for additional connection solutions between the gate and feeder 123. Also, clearly visible is the complete blocking of animal movement between confinement areas by the at least one latch assembly 50 latched to the at least c-bracket 127 bolted to the at least one feeder 123.

Figure 23:
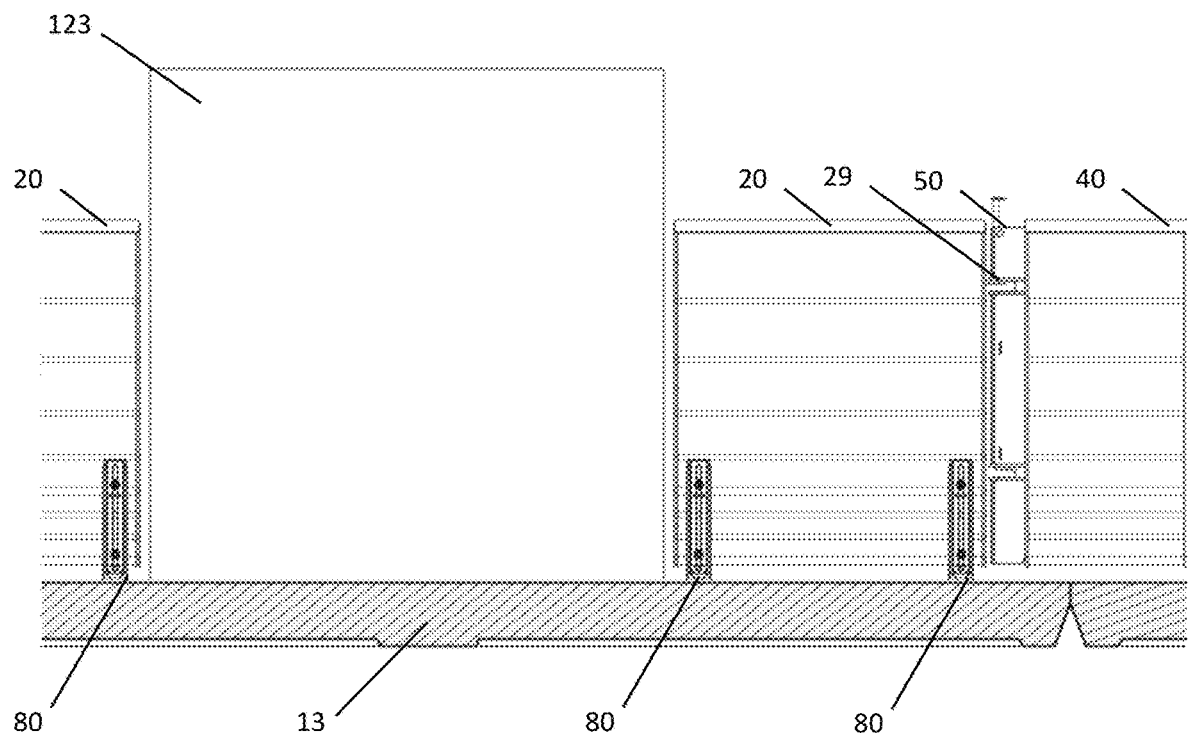
FIG. 23 is a side view of a feeder line with a fixed-gate assembly on either side of the feeder; wherein the feeder is secured to the floor and the right fixed-gate assembly has a swing-gate assembly attached to a tab.

In one arrangement, as shown in FIG. 23, when the feeder 123 is to be secured to the at least one floor slat panel 13, the at least one fixed-gate assembly 20 is configured, with or without the at least one tab 29, to be secured to the at least one floor slat panel 13, using at least one footplate assembly 80. The configuration of the at least one fixed-gate assembly 20 with combinations of the at least one tab 29, and the at least one latch assembly 50 meets all pen configuration requirements. This provides the complete blocking of animal movement between confinement areas by the at least one latch assembly 50 latched to the at least one fixed-gate assembly 20 with the at least one tab 29.

Figure 24:
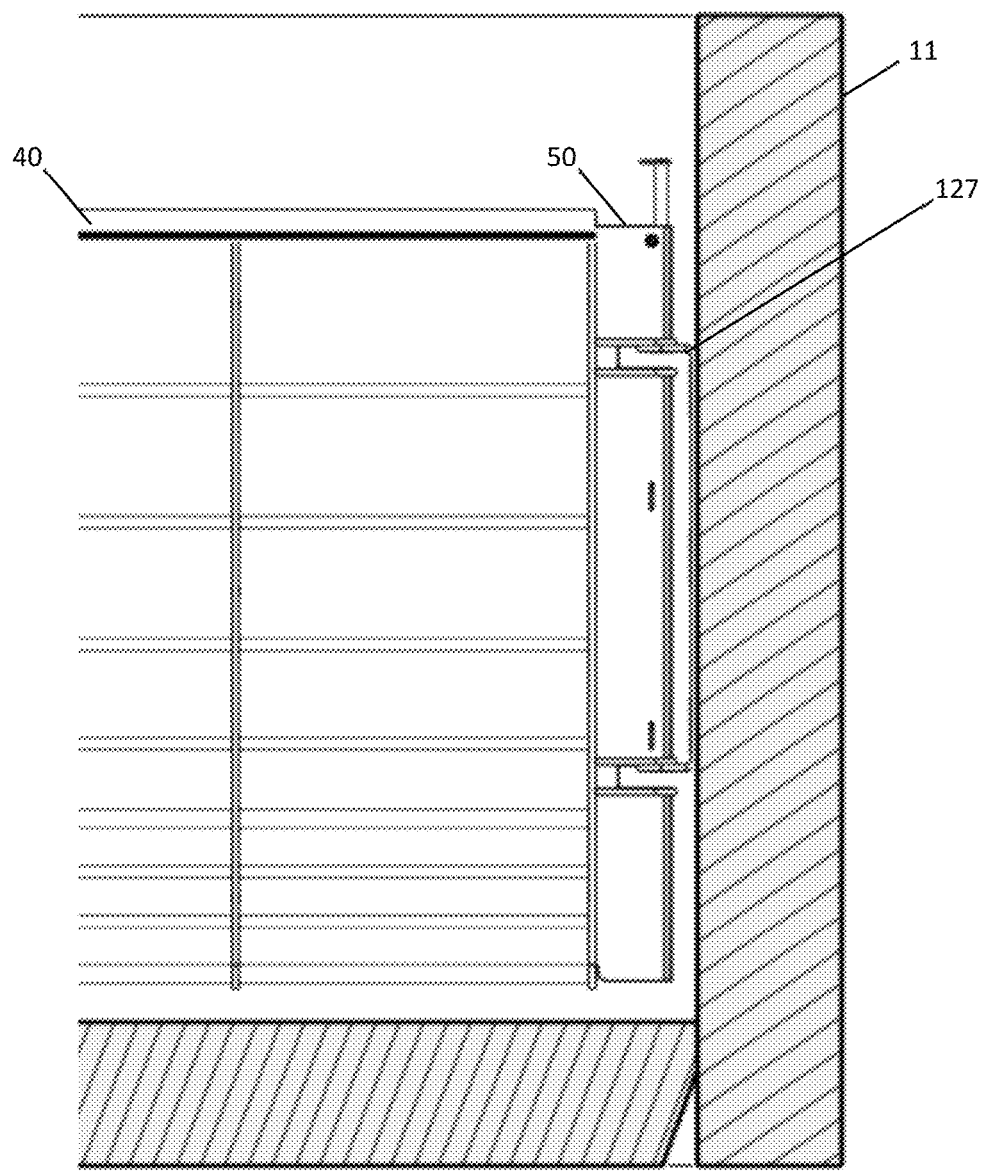
FIG. 24 is a side view of a swing-gate assembly secured to a c-bracket, which is secured to a fixed structure, in this instance a building wall.
Figure 25:
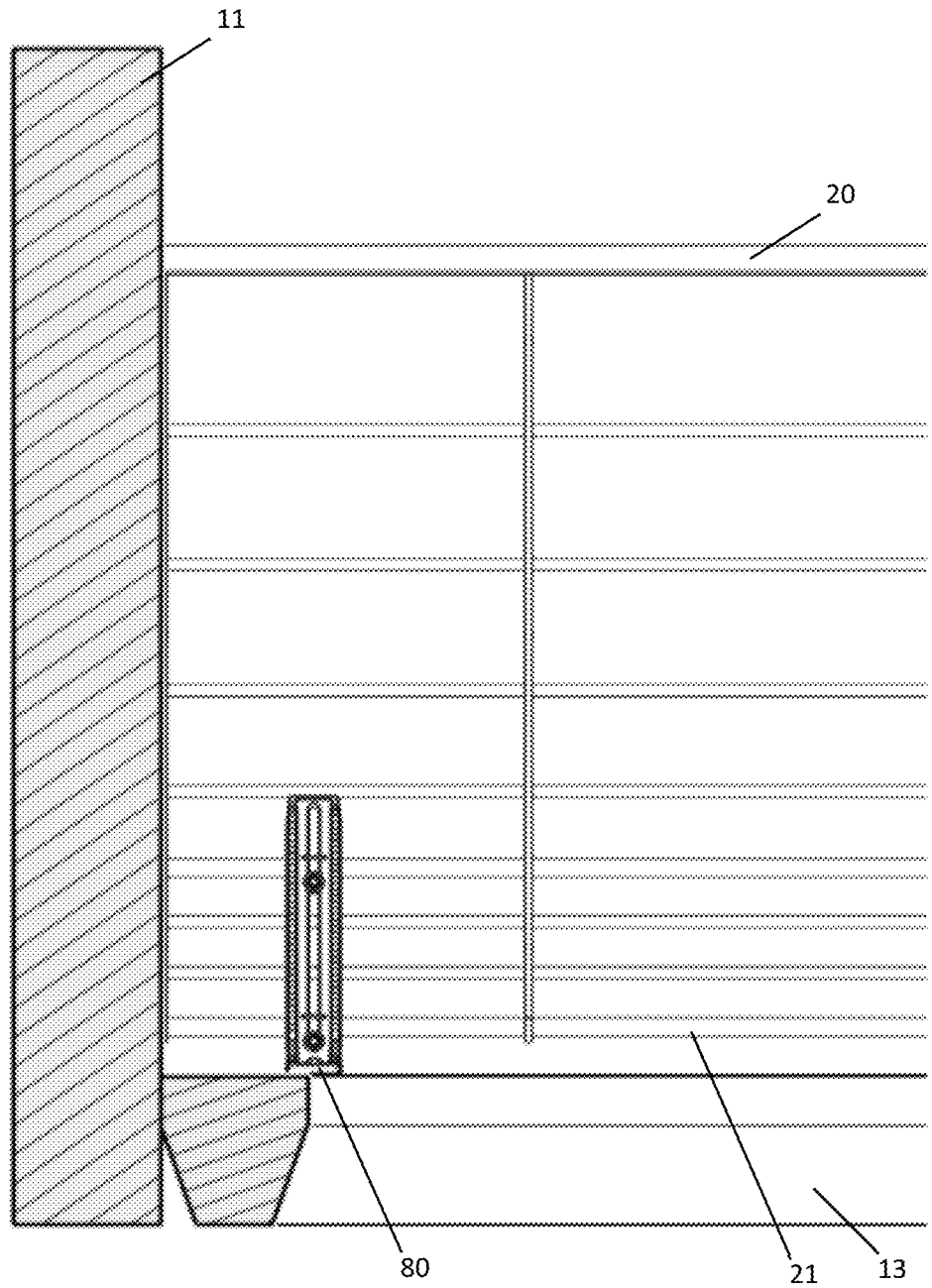
FIG. 25 is a side view of a fixed-gate assembly positioned to a wall and secured only to the floor with a footplate eliminating the need for securing the gate to the wall with bolts or concrete anchors.

In one arrangement, as shown in FIG. 24, the at least one swing-gate assembly 40 and the at least one c-bracket 127 are secured to the at least one wall 11. Although not shown, the at least one c-bracket 127, is mounted singularly or in in apposing pairs to any structure including the at least one fixed-gate assembly 20, the at least one swing-gate 40, the at least one wall 11, the at least one feeder 123, and any other gating or building structure. Like previously shown in the feeder c-bracket installation, the at least one latch assembly 50 and the at least one c-bracket 127 completely and simply block animal movement between confinement areas without any additional hardware.

In one arrangement, the at least one fixed-gate assembly 20 with two (2) structurally significant longitudinally extending member 21, and at least one footplate assembly 80 are positioned in order to intersect the at least one floor slat slot 15 and provide a rigid and simplified gating installation for non-swing-gate installations butting up to the at least one wall 11, of the at least one feeder line 121 and the at least one divider line 125.

Figure 26:
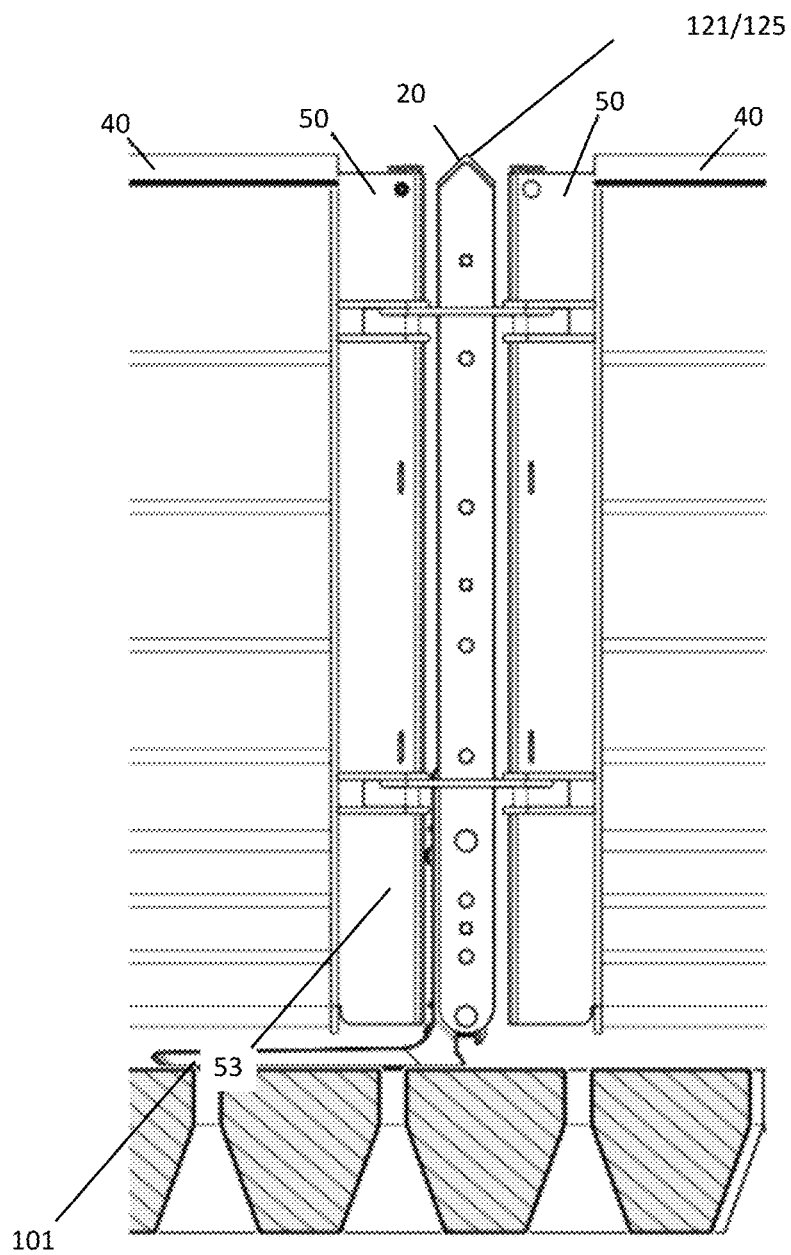
FIG. 26 is a side view of two swing-gate assemblies connected to the end of a fixed-gate assembly; wherein this configuration is very common along a shared alley between two sets of confinement areas.

In one arrangement, as shown in FIG. 26, the alley gate, as commonly referred to, is a swing-gate assembly 40 that connects between the at least one feeder line assembly 121 and the at least one divider line 125. This configuration places two latch assemblies 50 connected to the at least one fixed-gate assembly 20, and at least one tab 29. This configuration provides the complete blocking of animal movement between confinement areas or alleys by the at least one latch assembly 50.

Figure 27:
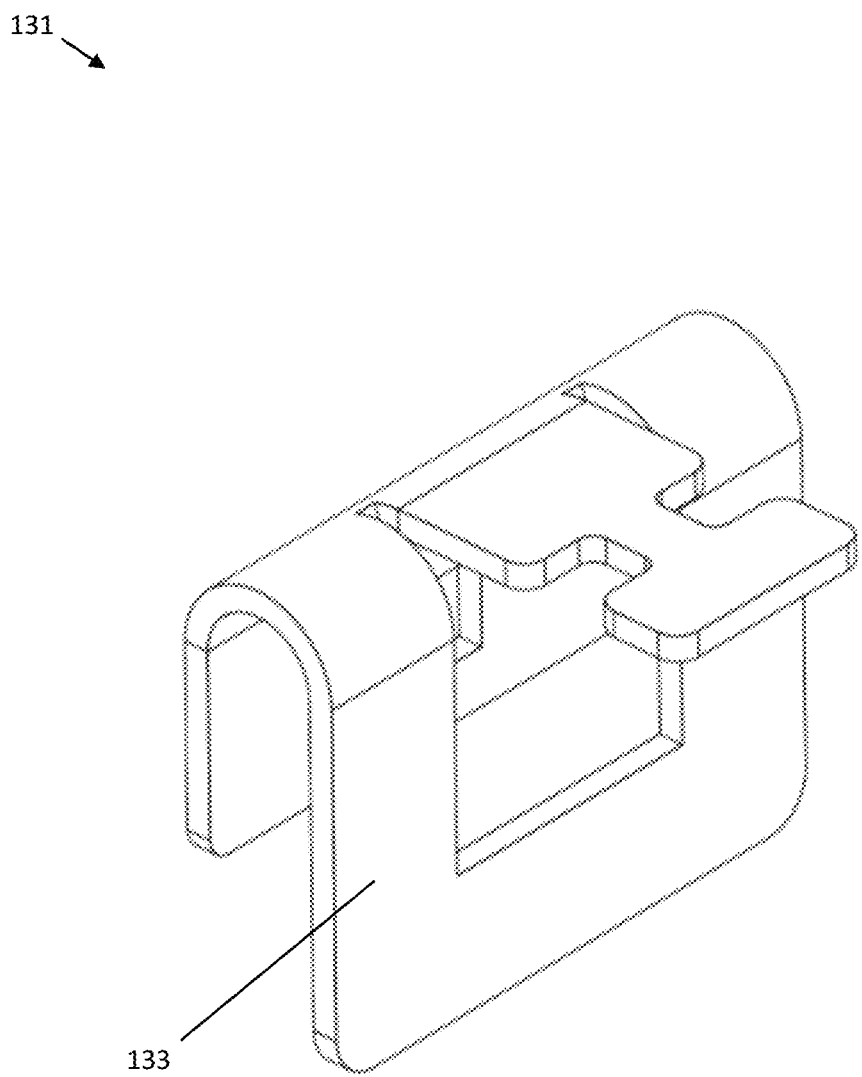
FIG. 27 is a prospective view of a spacer tab used to connect a gate to the footplate that does not have equal diameter longitudinally extending structural members.
Figure 28:
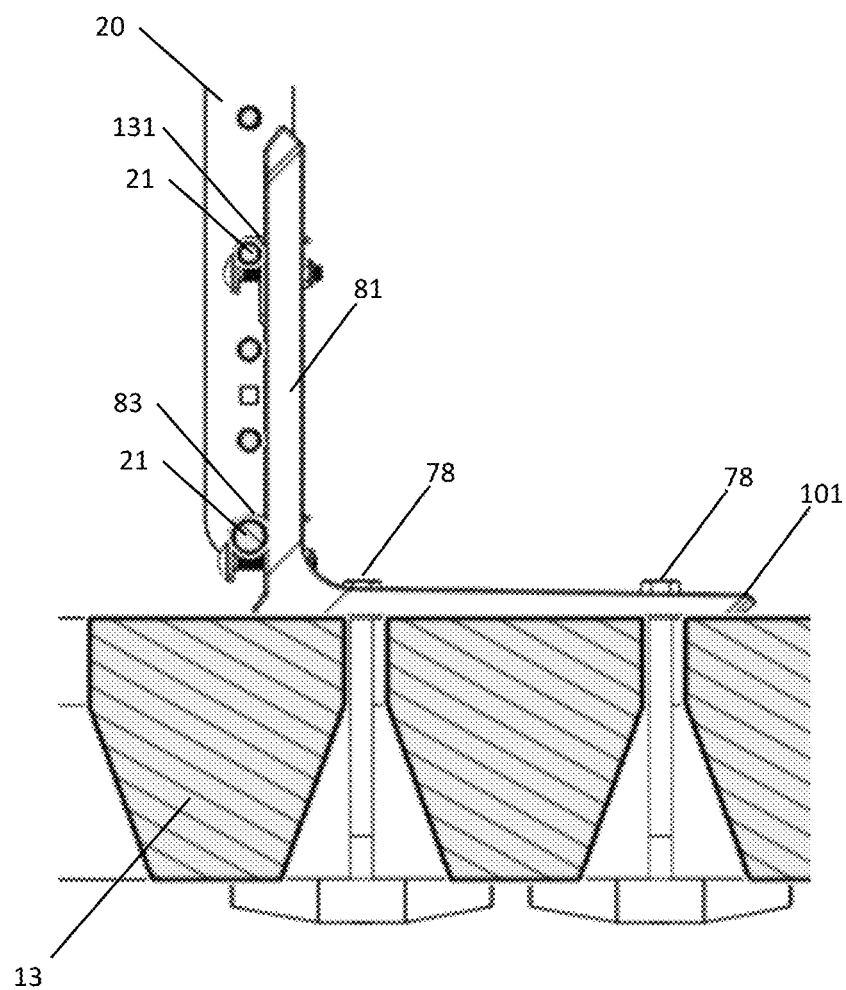
FIG. 28 is a prospective view of fixed-gate unequal diameter longitudinally extending structural members connected to the footplate using a spacer tab.

In another arrangement, as shown in FIG. 27, the gating system comprises at least one compensation t-strap 131 which includes at least one compensation t-strap offset tab 133, an integral element of a fabricated part. In one arrangement, as shown in FIG. 28, the at least one compensation t-strap 131 may be positioned between the at least one longitudinally extending member 27 and the at least one at least one footplate 81 in order to compensate for diameter variations between the at least one structurally significant longitudinally extending member 21 and the at least one longitudinally extending member 27. The at least one fixed-gate assembly 20, the at least one structurally significant longitudinally extending member 21, and the at least one longitudinally extending member 27 are secured to the at least one at least one footplate 81 with the at least one compensation t-strap 131 and the at least one t-strap 83 to form a defined gate assembly. The defined gate assembly is then secured to the at least one floor slat panel 13 with the at least t-bolt assembly 78.

In another arrangement, as one example, the at least one footplate 81 can provide structural support for gates, posts, farrowing crates, gestation stalls, divider gates, fan guards, and many more confinement barn penning components.

In another arrangement, a farrowing crate, gestation pen, or any other gate style panel when configured with at least two (2) structurally significant longitudinally extending members 21 is mountable to the at least one floor slat panel 13 using the same method as described herein. As a result, any configuration of a gate configured with at least two structurally significant longitudinally extending members 21 is contemplated by the disclosure.

Furthermore, when a farrowing and gestation pen door is configured with the at least two (2) structurally significant longitudinally extending members 21, the configuration may be any geometry and may be solid or hollow without departing from the disclosure. Additionally, the configuration can transfer gate loading to a vertical plate 23 without failure. The configuration may be spaced vertically at any increment without departing from the disclosure.

This disclosure provides an improved gating system and method for confinement pen construction which efficiently and completely creates a confinement animal penning solution for gating, farrowing, and gestation gating. In one arrangement, as an example, the gating system may include the following components: at least one fixed-gate assembly with two structurally significant longitudinally extending members 20; at least one cast footplate assembly 80; at least one swing-gate assembly 50; and at least one c-bracket 127. However, as provided above, the gating system may include more or less components, depending on the specific needs for the particular gating system, without departing from the disclosure. It is to be noted that all components and assemblies will (1) satisfy maintaining animal well-being, and (2) are capable of high production manufacturing methods, such as thermal cutting, casting, and robotic welding.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

REFERENCE NUMERALS 10 barn
11 wall
13 floor slat panel
15 floor slat slot
20 fixed-gate assembly
21 structurally significant longitudinally extending member
22 formed exoskeletal fixed-gate assembly
23 vertical plate
24 mounting holes
25 top structural longitudinally extending member
27 longitudinally extending member
29 tab
31 tab-slot
40 swing-gate assembly
42 formed exoskeletal swing-gate assembly
44 formed latch assembly
46 formed tab end assembly
50 latch assembly
52 hinge pin weldment
53 upper hinge pin
55 lower hinge pin
57 hinge pin connector plate
59 lift tab
61 u-channel
62 upper u-channel
63 radius
64 lower u-channel
65 tab relief slot
67 wear plate
69 pin guide
70 formed pin guide
71 bolt and nut
72 formed longitudinally extending member guide
73 latch closed state
74 attachment relief
75 latch open state
77 relief longitudinally extending member guide
78 t-bolt assembly
80 footplate assembly
80a offset footplate assembly
81 footplate
82 offset footplate
83 t-strap
84 cast clamp
85 bolt, washer and nut
87 H-profile
89 footplate gate slot
90 offset footplate gate slot
91a serration
91b serration
91c serration
91d serration
93 gate slot axis
95 H-profile centerline plane
97 footplate floor slot
98 floor slot casting profile
99 H-profile legs
101 planar mount
103 reverse planar mount
105 structurally significant longitudinally extending member centerline
106 under gate t-bolt zone
107 floor slot casting profile
109 footplate tandem mount
110 welded footplate assembly
111 side plate
113 formed center plate
120 barn gating
121 feeder gate line
123 feeder
125 divider gate line
127 c-bracket
129 c-bracket slot
131 compensation t-strap
133 compensation t-strap offset tab Free Body Diagram Notation $F_{x1}, F_{y1}, F_{z1}$ animal force applied components
$F_{x2}, F_{y2}, F_{z2}$ structurally significant longitudinally extending member component forces
$F_{x3}, F_{y3}, F_{z3}$ structurally significant longitudinally extending member component forces
$F_{x4}, F_{y4}, F_{z4}$ footplate component forces
$F_{x5}, F_{y5}, F_{z5}$ footplate component forces
$F_{x6}, F_{y6}, F_{z6}$ footplate t-bolt component forces
$F_{x7}, F_{y7}, F_{z7}$ footplate t-bolt component forces

What is claimed:
1. A gating system for animal confinement within a building, comprising:
   an animal confinement area;
      wherein the animal confinement area can house at least one animal;
      wherein the system comprises a plurality of confinement areas;
      wherein movement of the at least one animal between the plurality of confinement areas is prevented;
   a floor constructed of a plurality of concrete floor slat panels;
      wherein the plurality of concrete floor slat panels contain a plurality of floor slat slots;
      wherein a bio-waste pit is located below the plurality of concrete floor slat panels;
   a gate alignment error existing between a barn length, a number of confinement areas, calculated gate centerlines, and the relative position of at least one floor slat slot;
   at least one feeder;
      wherein the at least one feeder is a confining barrier of at least one confinement area;
   at least one exoskeletal fixed-gate assembly;
      wherein the at least one exoskeletal fixed-gate assembly is a confining structure of the at least one confinement area;
   at least one footplate;
      wherein the footplate secures the at least one fixed-gate assembly to the plurality of concrete floor slat panels;
   a t-strap;
      wherein the t-strap secures the at least one footplate to the at least one fixed-gate assembly;
   at least one wall;
   at least one latch assembly;

wherein the at least one latch assembly is connected to the at least one exoskeletal fixed-gate assembly;
wherein the at least one latch assembly is connected to at least one exoskeletal swing-gate assembly;
at least one c-bracket;
wherein the at least one c-bracket is connected to at least one wall;
wherein the at least one c-bracket is connected to the at least one feeder;
wherein the at least one c-bracket is connected to the at least one fixed-gate assembly;
wherein the at least one latch assembly is connected to the at least one c-bracket;
the at least one exoskeletal swing-gate assembly; and
wherein the at least one exoskeletal swing-gate assembly is a confining structure of the at least one confinement area.

2. The gating system of 1, further comprising:
at least one structurally significant longitudinally extending member;
wherein the at least one structurally significant longitudinally extending member is structurally significant to transfer gate loading to the plurality of concrete floor slat panels;
wherein the at least one structurally significant longitudinally extending member is structurally significant to prevent the at least one animal from moving between the plurality of confinement areas;
wherein the at least one structurally significant longitudinally extending member transfers animal loading from the at least one exoskeletal fixed-gate assembly to the at least one footplate;
wherein the at least one structurally significant longitudinally extending member is vertically spaced;
at least one longitudinally extending member;
wherein the at least one longitudinally extending member is vertically spaced to prevent the at least one animal from moving between the plurality of confinement areas;
at least one vertical plate;
wherein the at least one vertical plate extends from a lowest longitudinally extending member to a highest longitudinally extending member;
wherein the at least one structurally significant longitudinally extending member and the at least one longitudinally extending member are vertically arranged, extending through the at least one vertical plate in any combination to prevent the at least one animal from moving between the plurality of confinement areas; and
wherein the at least one structurally significant longitudinally extending member and the at least one longitudinally extending member are vertically arranged, extending through at least one vertical plate in any combination to transfer animal loading to the at least one footplate.

3. The gating system of 2 wherein:
the at least one structurally significant longitudinally extending member comprises two structurally significant longitudinally extending members;
wherein the structurally significant longitudinally extending members are vertically spaced;
wherein the structurally significant longitudinally extending members provide infinite longitudinal positions between the at least one vertical plate and a translated and parallel vertical plate for attaching the at least one footplate;
wherein the infinite placement of the at least one footplate eliminates the length of the exoskeletal fixed-gate assembly depending on the floor slat configurations or placement within a barn;
wherein the structurally significant longitudinally extending members eliminate the need for additional structures at gate joints or end points;
wherein the at least one exoskeletal fixed-gate assembly can be infinitely positioned and mounted parallel to the at least one floor slat slot unconstrained by gate alignment error;
the at least one exoskeletal fixed-gate assembly can be mounted perpendicular to the at least one floor slat slot; and
the at least one exoskeletal fixed-gate assembly can be mounted at any angle reference to the at least one floor slat slot.

4. The gating system of 1, further comprising:
at least one formed latch assembly;
wherein the formed latch assembly comprises at least one hinge pin assembly; and
wherein the position of the at least one hinge pin assembly determines the latched or unlatched state.

5. The gating system of 4 wherein:
the at least one formed latch assembly comprises;
at least one upper u-channel;
at least one lower u-channel;
at least one formed longitudinally extending member guide and apposing guide;
at least one relief longitudinally extending member guide and apposing guide;
at least one formed pin guide and apposing guide;
at least one wear plate;
wherein the at least one latch assembly is welded to at least one structurally significant longitudinally extending member;
wherein the at least one latch assembly is welded to at least one longitudinally extending member;
wherein the at least one latch assembly is welded to at least one longitudinally extending top member;
to form the at least one exoskeletal fixed-gate assembly or the at least one exoskeletal swing-gate assembly.

6. The gating system of 1, further comprising:
at least one formed tab end assembly;
wherein the tab end assembly comprises the at least one exoskeletal swing-gate assembly;
wherein the at least one exoskeletal swing-gate assembly is secured when at least one end is latched; and
wherein the at least one exoskeletal swing-gate assembly rotates about when the one end is unlatched.

7. The gating system of 5 wherein:
at least one formed tab end assembly comprises;
the at least one upper u-channel;
the at least one lower u-channel;
the at least one formed longitudinally extending member guide and apposing guide;
the at least one relief longitudinally extending member guide and apposing guide;
at least one tab;
wherein the at least one latch assembly is welded to the at least one structurally significant longitudinally extending member;
wherein the at least one latch assembly is welded to the at least one longitudinally extending member;
wherein the at least one latch assembly is welded to the at least one longitudinally extending top member;

to form at least one formed exoskeletal fixed-gate assembly or the at least one exoskeletal swing-gate assembly.

* * * * *